United States Patent
Zhao et al.

(10) Patent No.: US 12,524,762 B2
(45) Date of Patent: Jan. 13, 2026

(54) TRAFFIC INFORMATION PROCESSING METHODS, APPARATUSES, ELECTRONIC DEVICES, SERVERS, AND STORAGE MEDIUMS

(71) Applicants: Beijing BOE Technology Development Co., Ltd., Beijing (CN); BOE Technology Group Co., Ltd., Beijing (CN)

(72) Inventors: Junjie Zhao, Beijing (CN); Hongxiang Shen, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 213 days.

(21) Appl. No.: 18/278,380

(22) PCT Filed: Oct. 27, 2021

(86) PCT No.: PCT/CN2021/126802
§ 371 (c)(1),
(2) Date: Aug. 22, 2023

(87) PCT Pub. No.: WO2023/070386
PCT Pub. Date: May 4, 2023

(65) Prior Publication Data
US 2024/0054489 A1    Feb. 15, 2024

(51) Int. Cl.
*G06Q 20/40* (2012.01)
*G06Q 20/38* (2012.01)
*G08G 1/04* (2006.01)

(52) U.S. Cl.
CPC ......... *G06Q 20/401* (2013.01); *G06Q 20/389* (2013.01); *G08G 1/04* (2013.01)

(58) Field of Classification Search
CPC .... G06Q 20/401; G06Q 50/40; G06Q 20/389; G06Q 50/26; G08G 1/0175; G08G 1/04;
(Continued)

(56) References Cited

U.S. PATENT DOCUMENTS 10,796,371 B1 * 10/2020 Floyd .................. G07C 5/02
10,949,926 B1 *  3/2021 Call ................... G06Q 40/08
(Continued)

FOREIGN PATENT DOCUMENTS

CN    103678331 A    3/2014
CN    109118765 A    1/2019
(Continued)

OTHER PUBLICATIONS

KR-102081777-B1 with English translation; date filed May 15, 2019; date published Feb. 27, 2020. (Year: 2020).*
(Continued)

*Primary Examiner* — Calvin Cheung
(74) *Attorney, Agent, or Firm* — IPro, PLLC

(57) ABSTRACT

The present disclosure relates to traffic information processing methods, including: receiving transaction information sent by a first vehicle, the transaction information carrying violation information of the target vehicle detected by the first vehicle; the smart contract being used to determine second vehicles to verify the transaction information, and sending the violation information to the second vehicles such that the second vehicles generate verification results based on the violation information; determining whether the target vehicle has violated traffic rules based on the verification results; if determining that the target vehicle has violated traffic rules, storing the violation information in the blockchain network.

16 Claims, 9 Drawing Sheets

(58) Field of Classification Search
CPC ...... G08G 1/0112; G16Y 40/10; G16Y 10/40; G16Y 20/20; G16Y 40/20; H04L 67/1097; H04L 67/12
See application file for complete search history.

(56) References Cited

U.S. PATENT DOCUMENTS

| | | | |
|---|---|---|---|
| 11,361,388 B1 * | 6/2022 | Floyd | G06Q 40/08 |
| 2021/0042869 A1 * | 2/2021 | Zheng | G06Q 50/26 |
| 2021/0239492 A1 | 8/2021 | Yano et al. | |
| 2021/0261168 A1 | 8/2021 | Mcfarland, Jr. | |
| 2023/0162309 A1 | 5/2023 | Yang et al. | |

FOREIGN PATENT DOCUMENTS

| | | | | |
|---|---|---|---|---|
| CN | 109118779 A | 1/2019 | | |
| CN | 109166319 A | 1/2019 | | |
| CN | 109325751 A | 2/2019 | | |
| CN | 110400467 A | 11/2019 | | |
| CN | 110427432 A | 11/2019 | | |
| CN | 110428351 A | 11/2019 | | |
| CN | 110533912 A | 12/2019 | | |
| CN | 111506652 A | 8/2020 | | |
| CN | 111600839 A | 8/2020 | | |
| CN | 111639836 A | 9/2020 | | |
| CN | 112883936 A | 6/2021 | | |
| EP | 3485437 B1 * | 4/2024 | ......... | G06Q 30/0609 |
| KR | 101680260 B1 | 11/2016 | | |

OTHER PUBLICATIONS

CN-111078690-A with English translation; date filed Nov. 22, 2019; date published Apr. 28, 2020. (Year: 2020).*
CN-109118765-A with English translation; date filed Sep. 4, 2018; date published Jan. 1, 2019. (Year: 2019).*
CN 110427432 A with English translation; date filed Aug. 8, 2019; date published Nov. 8, 2019. (Year: 2019).*
CN 110599774 A with English translation; date filed Aug. 23, 2019; date published Dec. 20, 2019. (Year: 2019).*
CN2021800031169 first office action.
CN2021800031169 second office action.
CN2021800031169 Decision of Rejection.
PCT/CN2021/126802 international search report.
PCT/CN2021/126802 Written Opinion.

* cited by examiner

TRAFFIC INFORMATION PROCESSING METHODS, APPARATUSES, ELECTRONIC DEVICES, SERVERS, AND STORAGE MEDIUMS

CROSS-REFERENCE TO RELATED APPLICATIONS

This application is a national stage of international PCT Application No. PCT/CN2021/126802, filed on Oct. 27, 2021, the entire contents of which are incorporated herein by reference for all purposes.

TECHNICAL FIELD

The present disclosure relates to the field of traffic technology, and more particularly, to traffic information processing methods, traffic information processing apparatuses, electronic devices, servers, and storage mediums.

BACKGROUND

An existing road traffic rule violation system can determine and record violation of traffic rules by vehicles. However, a general implementation is to capture images through cameras provided at fixed locations and determine from the images, which has limited coverage and is difficult to widely determine violation of traffic rules by vehicles.

However, if the coverage is to be improved by providing more cameras in fixed locations, the amount of workload required will be too high, and it is still difficult to achieve full road coverage in some remote sections.

SUMMARY

In view of the above, the present disclosure provides traffic information processing methods, traffic information processing apparatuses, electronic devices, servers, and storage mediums, in order to address the technical problem in the related art.

According to a first aspect of the embodiments of the present disclosure, there is provided a traffic information processing method, applied to a blockchain network, and the method including:
  receiving transaction information sent by a first vehicle, the transaction information carrying violation information of the target vehicle detected by the first vehicle;
  triggering a smart contract based on the transaction information, the smart contract being used to determine second vehicles to verify the transaction information, and sending the violation information to the second vehicles such that the second vehicles generate verification results based on the violation information;
  determining whether the target vehicle has violated traffic rules based on the verification results; if determining that the target vehicle has violated traffic rules, storing the violation information in the blockchain network.

According to a second aspect of the embodiments of the present disclosure, there is provided a traffic information processing method, applied to a server, and the method including:
  receiving violation information of a target vehicle sent by a first vehicle when the first vehicle detects that the target vehicle violates traffic rules;
  determining second vehicles to verify the violation information and sending the violation information to the second vehicles;
  acquiring verification information obtained by the second vehicles based on the violation information, to determine whether the target vehicle has violated traffic rules based on the verification information, and if determining that the target vehicle has violated traffic rules, storing the violation information.

According to a third aspect of the embodiments of the present disclosure, there is provided a traffic information processing method, applied to a server, and the method including:
  receiving first violation information of a target vehicle sent by a first vehicle when the first vehicle detects a violation of traffic rules by the target vehicle, and receiving further violation information of the target vehicle sent by further vehicles when further vehicles detect a violation of traffic rules by the target vehicle;
  verifying the first violation information based on the further violation information, to determine verification passed vehicles corresponding to further violation information, from the further violation information, based on which the verification on the first violation information has been passed;
  determining whether the target vehicle has violated traffic rules based on a number of the verification passed vehicles; if determining that the target vehicle has violated traffic rules, storing the violation information.

According to a fourth aspect of the embodiments of the present disclosure, there is provided a traffic information processing apparatus, applied to a blockchain network, the apparatus including one or more processors configured to perform:
  receiving transaction information sent by a first vehicle, the transaction information carrying violation information of the target vehicle detected by the first vehicle;
  triggering a smart contract based on the transaction information, the smart contract being used to determine second vehicles to verify the transaction information, and sending the violation information to the second vehicles such that the second vehicles generate verification results based on the violation information;
  determining whether the target vehicle has violated traffic rules based on the verification results; if determining that the target vehicle has violated traffic rules, storing the violation information in the blockchain network.

According to a fifth aspect of the embodiments of the present disclosure, there is provided a traffic information processing apparatus, applied to a server, the apparatus including one or more processors configured to perform:
  receiving violation information of a target vehicle sent by a first vehicle when the first vehicle detects that the target vehicle violates traffic rules;
  determining second vehicles to verify the violation information and sending the violation information to the second vehicles;
  acquiring verification information obtained by the second vehicles based on the violation information, to determine whether the target vehicle has violated traffic rules based on the verification information, and if determining that the target vehicle has violated traffic rules, storing the violation information.

According to a sixth aspect of the embodiments of the present disclosure, there is provided a traffic information processing apparatus, applied to a server, the apparatus including one or more processors configured to perform:
  receiving first violation information of a target vehicle sent by a first vehicle when the first vehicle detects a violation of traffic rules by the target vehicle, and receiving further violation information of the target vehicle sent by further vehicles when further vehicles detect a violation of traffic rules by the target vehicle;

verifying the first violation information based on the further violation information, to determine verification passed vehicles corresponding to further violation information, from the further violation information, based on which the verification on the first violation information has been passed;

determining whether the target vehicle has violated traffic rules based on a number of the verification passed vehicles; if determining that the target vehicle has violated traffic rules, storing the violation information.

According to a seventh aspect of the embodiments of the present disclosure, there is provided an electronic device including: a processor; a memory used to store processor executable instructions; wherein the processor is configured to perform the method applied to a blockchain network.

According to an eighth aspect of the embodiments of the present disclosure, there is provided a server including: a processor; a memory used to store processor executable instructions; wherein the processor is configured to perform the method applied to a server.

According to a ninth aspect of the embodiments of the present disclosure, there is provided a computer-readable storage medium on which a computer program is stored, wherein when the program is executed by a processor, steps of the method applied to a blockchain network.

According to a tenth aspect of the embodiments of the present disclosure, there is provided a computer-readable storage medium on which a computer program is stored, wherein when the program is executed by a processor, steps of the method applied to a server.

According to the embodiments of the present disclosure, target vehicles that violate traffic rules can be determined through mutual monitoring between vehicles. Due to the variety of road sections where vehicles travel and the fact that vehicles can move, compared to providing cameras on fixed road sections to determine vehicles that violate traffic rules, more vehicles in road sections can be monitored, increasing the scope of monitoring vehicle violations of traffic rules, and the cost is relatively low. Also, after monitoring the target vehicle that violates traffic rules, the violation information of the target vehicle can be sent to the blockchain network for verification, which is conducive to ensuring the accuracy and efficiency of determining the target vehicle's violation of traffic rules.

BRIEF DESCRIPTION OF THE DRAWINGS

In order to provide a clearer explanation of the technical solution in the embodiments of the present disclosures, a brief introduction will be given to the accompanying drawings referred in the description of the embodiments. Apparently, the accompanying drawings in the following description are only some embodiments of the present disclosure. For those ordinarily skilled in the art, other accompanying drawings can be obtained based on these drawings without any creative effort.

DETAILED DESCRIPTION OF THE EMBODIMENTS

The following will provide a clear and complete description of the technical solution in the embodiments of the present disclosure in conjunction with the accompanying drawings. Apparently, the described embodiments are only a part of the embodiments of the present disclosures, not all of them. Based on the embodiments in the present disclosure, all other embodiments obtained by those ordinarily skilled in the art without creative labor fall within the scope of protection in the present disclosure.

Figure 1:
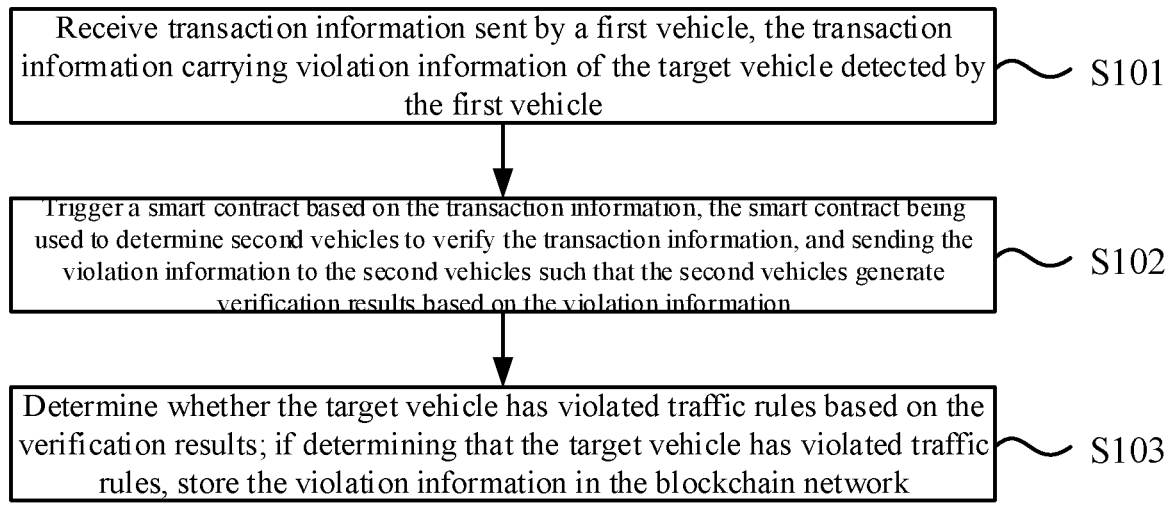
FIG. 1 is a schematic flowchart of a traffic information processing method illustrated according to an embodiment of the present disclosure.

FIG. 1 is a schematic flowchart of a traffic information processing method illustrated according to an embodiment of the present disclosure. The method shown in this embodiment can be applied to a blockchain network, which includes a plurality of vehicles and a regulatory agency. The plurality of vehicles can be taken as nodes in the blockchain network, and smart contracts are deployed in the nodes. Each vehicle can periodically send transaction information to the blockchain network, carrying a current location of the vehicle. Such location and a location carried by transaction information in subsequent embodiments can be associated with a time when the transaction information was sent.

The role played by each vehicle in different scenarios can vary. A first vehicle plays a monitoring role and can be referred to as a monitoring vehicle, a second vehicle plays a verification role and can be referred to as a verification vehicle, a vehicle that violates traffic rules detected by the first vehicle can be referred to as a target vehicle, and a vehicle that does not belong to the first, the second, and the target vehicles among the plurality of vehicles can be referred to as further vehicles.

In other scenarios, the identity of the vehicle can change with its role. For example, when the first vehicle violates traffic rules, the first vehicle can also serve as the target vehicle. When the second vehicle plays a monitoring role, the second vehicle can serve as the first vehicle, that is, the monitoring vehicle.

In the scenario shown in the following embodiments, the first vehicle mainly plays a monitoring role, the second vehicle plays a verification role, and the target vehicle is a vehicle that violates traffic rules detected by the first vehicle. An exemplary explanation will be given below for the technical solution.

As shown in FIG. 1, the traffic information processing method includes the following steps.

In step S101, transaction information sent by the first vehicle is received, the transaction information carrying violation information of the target vehicle detected by the first vehicle.

In step S102, a smart contract is triggered based on the transaction information, the smart contract is used to determine second vehicles to verify the transaction information, and the violation information is sent to the second vehicles to generate verification results based on the violation information.

In step S103, it is determined whether the target vehicle has violated traffic rules based on the verification results. If it is determined that the target vehicle has violated traffic rules, the violation information is stored in the blockchain network.

In one implementation, an image acquisition device can be installed in the vehicle, such as a driving recorder, a vehicle terminal equipped with a camera, etc. The vehicle can capture images of surrounding vehicles through the image acquisition device. For example, in the case of a driving recorder, it is generally installed in front of the vehicle to capture images in a traveling direction of the vehicle. After capturing images of surrounding vehicles, the image acquisition device can analyze the images to determine whether the vehicles in the images violate traffic rules.

For example, when the image acquisition device in the first vehicle captures an image containing vehicle A, it can determine whether vehicle A violates traffic rules based on an image recognition algorithm. For example, the image recognition algorithm can identify vehicle A in the image and environmental information around vehicle A in the image, and then determine whether vehicle A violates traffic rules based on a relationship between vehicle A and the environment. The image recognition algorithm includes but is not limited to deep learning algorithms.

For example, when determining that vehicle A crosses an intersection with a red traffic light on, it can be determined that vehicle A violates traffic rules, specifically by running a red light. For example, when determining that vehicle A crosses a solid line between adjacent lanes, it can be determined that vehicle A violates traffic rules, and the specific violation is a solid line lane change. For example, when determining that vehicle A is driving in an emergency lane, it can be determined that vehicle A violates traffic rules, specifically by occupying the emergency lane. For example, when determining that vehicle A is parked in a prohibited area, it can be determined that vehicle A violates traffic rules, and the specific violation is illegal parking.

The above is only an exemplary description of several situations where vehicle A violates traffic rules. For other situations where vehicle A violates traffic rules, image acquisition devices can also capture and determine them.

When determining that vehicle A violates traffic rules, it can be determined that vehicle A is the target vehicle and obtain violation information of the target vehicle. The violation information should at least include identity information of vehicle A, such as a license plate number of vehicle A, and further information, such as violation behavior and an image of the target vehicle's violation captured by the first vehicle.

Then the first vehicle can carry the violation information in the transaction information and send the transaction information to the blockchain network. A smart contract can be deployed in the nodes of the blockchain, and the smart contract can determine second vehicles to verify the transaction information. Upon receiving transaction information, the blockchain can trigger a smart contract, determine the second vehicles through the smart contract, and send violation information to the second vehicles. For example, the smart contract can send a request to the second vehicles, which carries the violation information. Here, the violation information sent to the second vehicles should at least include the identity information of the target vehicle, such as the license plate number of the target vehicle.

Upon receiving the violation information, the second vehicles can verify the violation information, such as verifying whether the violation information is true. The verification result can include yes or no, and can then the second vehicles can send transaction information to the blockchain network to carry the verification results to the blockchain network.

Here, a second vehicle can also verify the violation information through the image acquisition device equipped on the vehicle. For example, the image can be captured through the image acquisition device, and then it can be determined whether the target vehicle exists in the captured image. For example, the license plate number of the vehicle in the image can be determined, and it can be determined whether there is a license plate number the same with license plate number of the target vehicle. If so, it can be determined that there is a target vehicle in the image. If it does not exist, it is determined that the target vehicle does not exist in the image.

In determining the presence of the target vehicle in the image, it can be further determined whether the target vehicle has violated traffic rules. Here, the second vehicle determines whether the target vehicle has violated traffic rules in a similar way as the first vehicle determines whether the vehicle has violated traffic rules, which will not be repeated here. The verification result is Yes when the second vehicle determines that the target vehicle has violated traffic rules, and No when the target vehicle has not violated traffic rules.

After the blockchain network receives the verification results from a plurality of second vehicles, the smart contract can determine whether the target vehicle has violated traffic rules based on the received verification results. For example, it can be determined based on a proportion of verification results that are yes. If the proportion of verification results that are yes is higher than or equal to a preset proportion threshold (such as a proportion threshold of 60%), it can be determined that the target vehicle has indeed violated traffic rules. When 10 second vehicles are determined, if 7 verification results are Yes and the proportion of verification results is 70%, which is higher than 60%, it can be determined that the target vehicle has violated traffic rules.

Therefore, the violation information of the target vehicle can be stored in the blockchain network for subsequent acquisition by the target vehicle.

According to the embodiments of the present disclosure, target vehicles that violate traffic rules can be determined through mutual monitoring between vehicles. Due to the variety of road sections where vehicles travel and the fact that vehicles can move, compared to providing cameras on fixed road sections to determine vehicles that violate traffic rules, more vehicles in road sections can be monitored, increasing the scope of monitoring vehicle violations of traffic rules, and the cost is relatively low. Also, after monitoring the target vehicle that violates traffic rules, the violation information of the target vehicle can be sent to the blockchain network for verification, which is conducive to ensuring the accuracy and efficiency of determining the target vehicle's violation of traffic rules.

Figure 2:
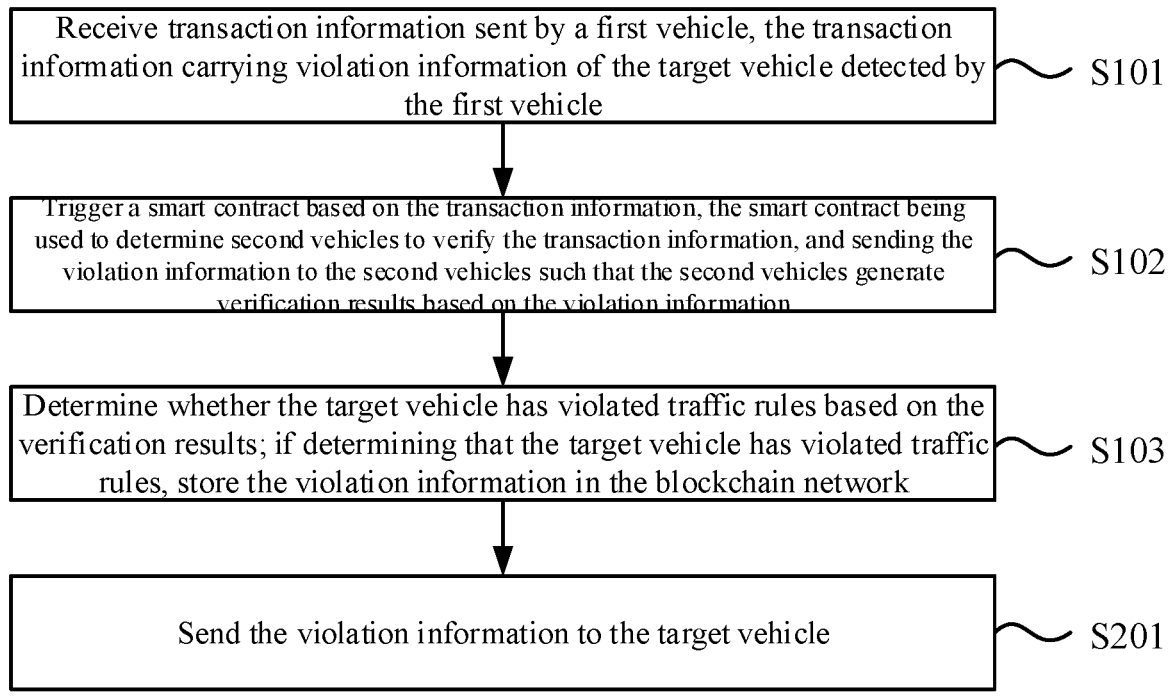
FIG. 2 is a schematic flowchart of another traffic information processing method illustrated according to an embodiment of the present disclosure.

FIG. 2 is a schematic flowchart of another traffic information processing method shown according to the embodiment of the present disclosure. As shown in FIG. 2, the method further includes the following steps.

In step S201, the violation information is sent to the target vehicle.

In one implementation, the blockchain network can store violation information and send the violation information to the target vehicle. For example, the blockchain network can automatically send the violation information to the target vehicle, or the blockchain network can send the violation information to the target vehicle upon receiving an acquisition request sent by the target vehicle.

Here, the violation information sent to the target vehicle at least includes the identity information and violation behavior of the target vehicle, can also include image information of the target vehicle's violation, so that after receiving the violation information, the target vehicle can determine its own violation situation based on the violation information and pay corresponding fines.

Figure 3:
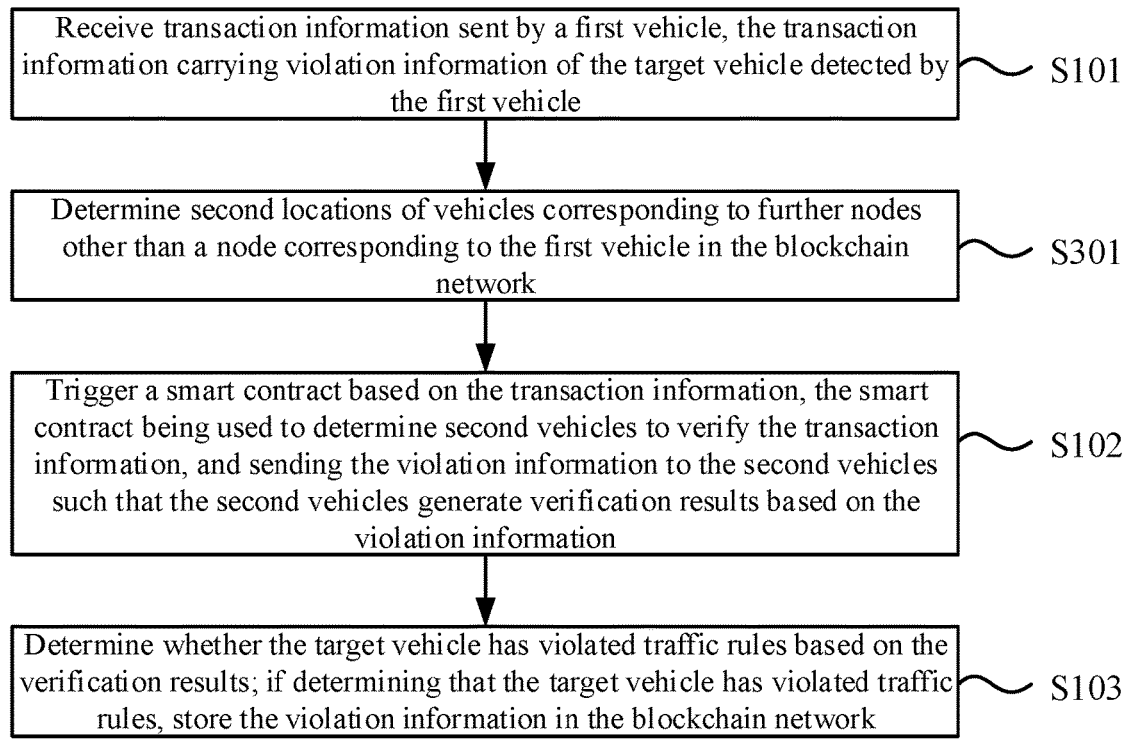
FIG. 3 is a schematic flowchart of another traffic information processing method illustrated according to an embodiment of the present disclosure.

FIG. 3 is a schematic flowchart of another traffic information processing method illustrated according to the embodiment of the present disclosure. As shown in FIG. 3, the transaction information also includes a first location of the first vehicle, and the method also includes the following steps.

In step S301, it is determined second locations of vehicles corresponding to further nodes other than the node corresponding to the first vehicle in the blockchain network;

Here, the smart contract is used to determine the second vehicles from the vehicles corresponding to the further nodes based on the first location and the second locations.

In one implementation, the vehicle corresponding to each node in the blockchain network can periodically report its own location, and the location is associated with the time when the location is reported, allowing the blockchain network to determine the real-time location of each vehicle. Here, in order to avoid user privacy leakage, the locations periodically reported by vehicles can be rough locations, such as those with accuracy lower than a preset accuracy threshold.

When the first vehicle sends the violation information of the target vehicle to the blockchain network by carrying the violation information in transaction information, the transaction information can also carry the first location of the first vehicle. In order to ensure accurate determination of the second vehicles, the first location carried in the transaction information can be an accurate location, such as a location with accuracy higher than the preset accuracy threshold.

After the transaction information triggers the smart contract, the smart contract can determine, from vehicles corresponding to further nodes, vehicles that are relatively close to the first vehicle as the second vehicles. For example, a location difference between a second location and the first location can be calculated, and a vehicle corresponding to a second location that has a location difference lower than a preset distance threshold can be determined as the second vehicle. Based on this, it can be ensured that the determined second vehicle is closer to the first vehicle, so that the second vehicle can capture images containing the target vehicle relatively clearly, and accurately verify whether the target vehicle violates traffic rules.

In one implementation, the transaction information further includes a traveling direction of the first vehicle.

Here, the smart contract is used to determine, from vehicles corresponding to further nodes, vehicles having a distance to the first location lower than a preset distance threshold and a traveling direction that meets a preset relationship with the traveling direction of the first vehicle, as the second vehicles.

When the first vehicle sends the violation information of the target vehicle to the blockchain network by carrying the violation information in transaction information, the transaction information can also carry a traveling direction of the first vehicle. After the transaction information triggers the smart contract, when the smart contract determines the second vehicles from the corresponding vehicles of further nodes, in addition to considering the distance between vehicles, it can also consider the traveling direction of the vehicle.

Due to the fact that image acquisition devices in vehicles are generally installed at the front of the vehicle, mainly capturing images in the traveling direction of the vehicle, when determining a second vehicle, it is possible to determine, from vehicles corresponding to further nodes, a vehicle having a traveling direction that meets a preset relationship (for example, an angle lower than a preset angle threshold) with the traveling direction of the first vehicle and having a distance to the first location lower than a preset distance threshold, as the second vehicle. Based on this, it can not only ensure that the determined second vehicle is close to the first vehicle, but also ensure that the target vehicle is located in the area corresponding to the traveling direction of the second vehicle, so that the second vehicle can capture images containing the target vehicle, and accurately verify whether the target vehicle violates traffic rules.

The smart contract can not only determine the second vehicles, but also determine whether the target vehicle has violated traffic rules based on the verification results. In addition to the proportional determination of whether the target vehicle has violated traffic rules in the above embodiment, it can also determine whether the target vehicle has violated traffic rules based on further methods as needed. The following are examples of how smart contract can determine whether the target vehicle has violated traffic rules based on verification results through several implementations.

In one implementation, the smart contract is used to determine, from the verification results, a first number of verification results which determine that the target vehicle has violated traffic rules, and to determine that the target vehicle has violated traffic rules when the first number is higher than a first number threshold.

Upon receiving verification results from the plurality of second vehicles, the smart contract of the blockchain network can determine whether the target vehicle has violated traffic rules based on the received verification results. For example, it can be determined based on the number of verification results that are yes. If the number of verification results that are yes is higher than or equal to the first number threshold, it can be determined that the target vehicle has indeed violated traffic rules. For example, the first number threshold is 6, and if 10 second vehicles are determined and 7 verification results are yes, higher than the first number threshold of 6, it can be determined that the target vehicle violates traffic rules. The violation information of the target vehicle can be stored in the blockchain network for subsequent acquisition by the target vehicle.

In one implementation, the smart contract is used to determine, from the verification results, a second number of verification results which determine that a probability of the target vehicle violating traffic rules is higher than a probability threshold, and to determine that the target vehicle has violated traffic rules when the second number is higher than a second number threshold.

Due to different locational relationships between second vehicles at different locations and the target vehicle, the captured images containing the target vehicle will also vary, and the probability of accurate verification results based on the images will also vary. For example, when verifying whether the target vehicle has violated traffic rules, the generated verification results can be probabilities, such as the probability of violating traffic rules.

After receiving verification results from a plurality of second vehicles, the smart contract of the blockchain network can determine whether the target vehicle has violated traffic rules based on the received verification results, for example, based on the second number of verification results which determine that a probability of the target vehicle violating traffic rules is higher than a probability threshold. If the second number is higher than or equal to the second number threshold, it can be determined that the target vehicle has indeed violated traffic rules, for example, if the probability threshold is 60% and the second number threshold is 5, and 10 second vehicles are determined, if 6 verification results has the probability of the target vehicle violating traffic rules higher than 60%, the second number is 6, and the second number threshold is 5, then it can be determined that the violation of traffic rules by the target vehicle. Therefore, the violation information of the target vehicle can be stored in the blockchain network for subsequent acquisition by the target vehicle.

Figure 4:
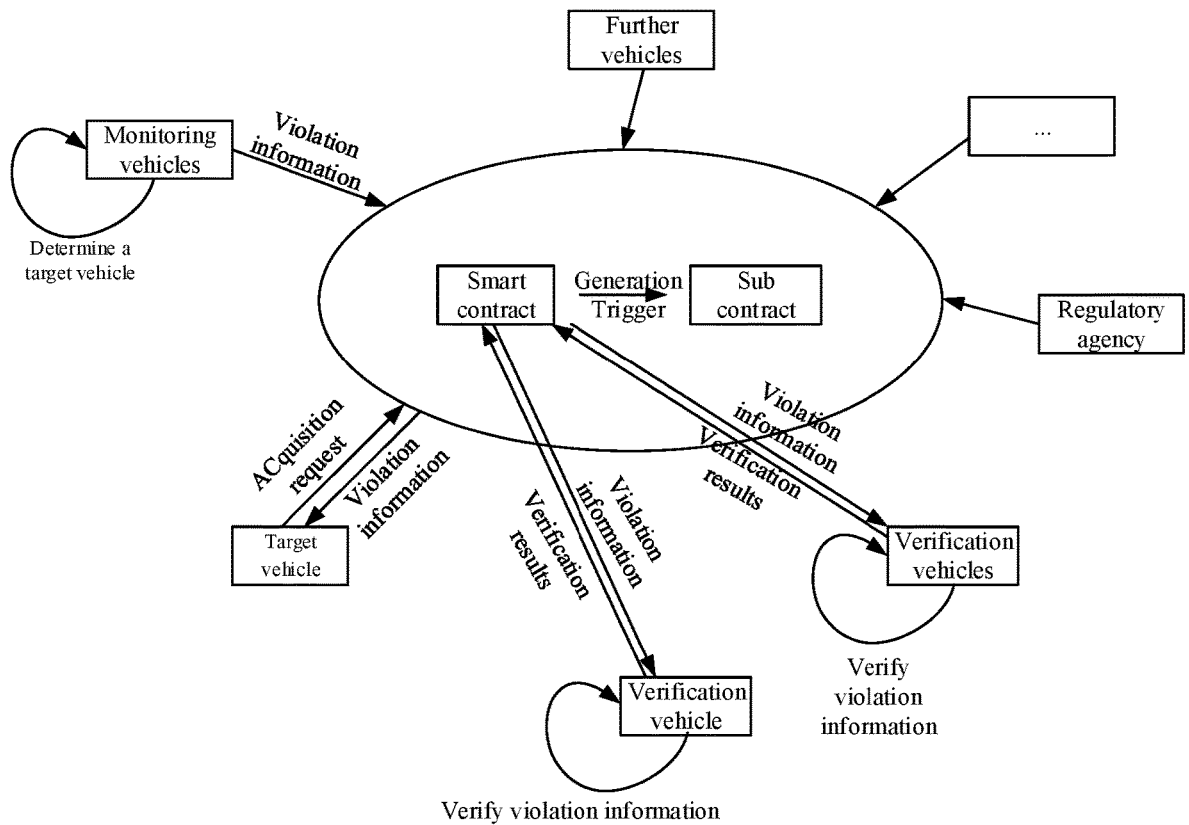
FIG. 4 is a schematic diagram of node relationships in a blockchain network according to an embodiment of the present disclosure.

FIG. 4 is a schematic diagram of node relationships in a blockchain network according to an embodiment of the present disclosure. As shown in FIG. 4, the blockchain network includes a plurality of vehicles and a regulatory agency, and the plurality of vehicles can be taken as nodes in the blockchain network.

The monitoring vehicle (also known as the first vehicle) can record the violation information of the target vehicle when the target vehicle violates traffic rules, and send transaction information to the blockchain network. The transaction information can carry the violation information, the identity information and location of the monitoring vehicle. The violation information can include the identity information and violation behavior of the target vehicle.

After receiving transaction information, the blockchain network triggers a smart contract, which can determine verification vehicles (i.e. the second vehicles) and send the violation information to the verification vehicles. After a verification vehicle receives the violation information, the verification vehicle can verify the violation information, such as verifying whether the target vehicle is in violation, and generating a verification result to be carried in the transaction information and sent the transaction information to the blockchain network.

After the blockchain network receives the verification results, the smart contract can determine whether the target vehicle has violated traffic rules based on the verification results. For example, the verification results include two situations: yes and no, where yes indicates that the target vehicle has violated traffic rules and no indicates that the target vehicle has not violated traffic rules. The smart contract can determine whether the number of vehicles with a verification result of yes is higher than the first number threshold, and if it is higher than the first number threshold, it can be determined that the target vehicle violates traffic rules and store the violation information of the target vehicle for subsequent transmission to the target vehicle.

In one implementation, the smart contract is used to generate a sub contract and periodically trigger the sub contract.

The sub contract is used to determine third vehicles to reverify the transaction information at the triggering time of the sub contract, and send the violation information to the third vehicles such that the third vehicles generate reverification results based on the violation information.

When the reverification result of the smart contract is that the target vehicle does not violate traffic rules, the sub contract can be deleted.

Figure 5:
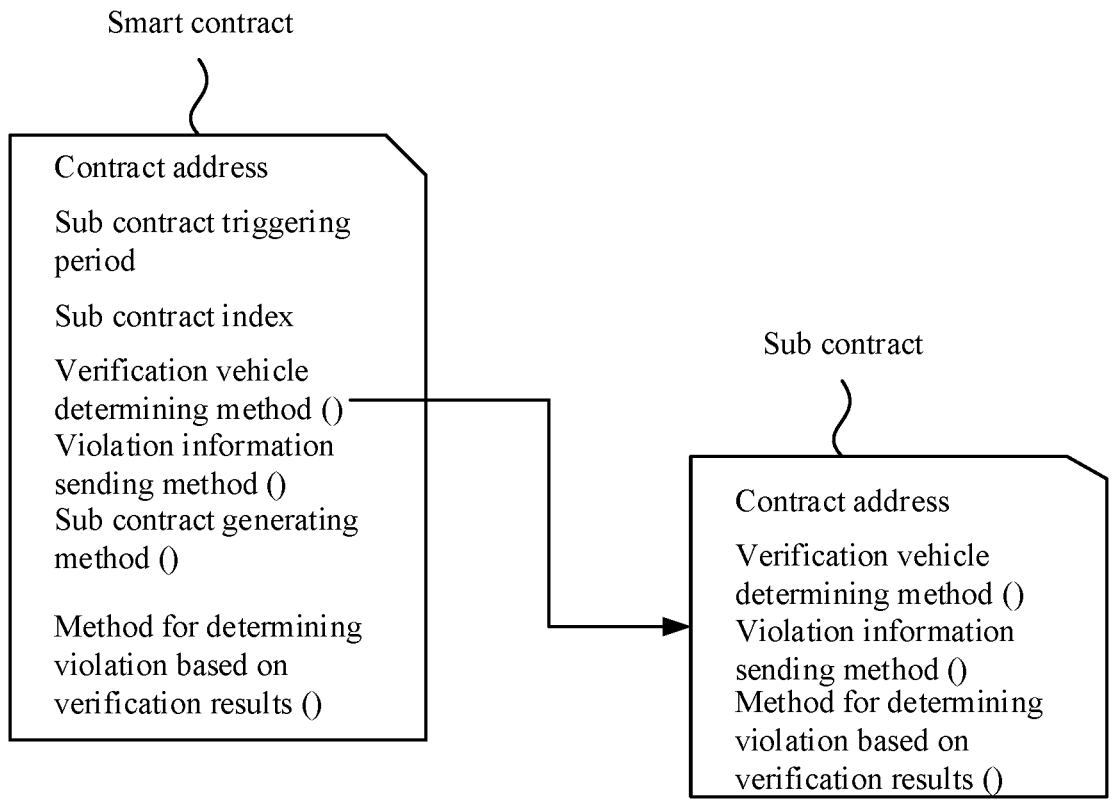
FIG. 5 is a schematic diagram of a relationship between a smart contract and a sub contract according to an embodiment of the present disclosure.

FIG. 5 is a schematic diagram of the relationship between a smart contract and a sub contract according to an embodiment of the present disclosure. As shown in FIG. 5, a smart contract includes a contract address, a sub contract triggering period, a sub contract index, a verification vehicle determining method, a violation information sending method, a sub contract generating method, and a method for determining violation based on verification results.

Here, the contract address is used for nodes in the blockchain to obtain the smart contract. The verification vehicle determining method is used to define a method for determining verification vehicles. The violation information sending method is a method for sending violation information to a verification vehicle. The method for determining violation based on verification results is used to define a method for determining whether the target vehicle is in violation based on the verification results.

The smart contract can also generate a sub contract. After generating a sub contract, the smart contract can include a sub contract index for nodes to obtain the sub contract. The method for generating a sub contract is used to define a method for generating a sub contract, such as what function is to be included in the generated sub contract.

Here, the function of the generated sub contract can be similar to the function of the smart contract, such as determining the vehicle used for verification and determining whether the target vehicle has violated traffic rules based on the verification results.

In one implementation, the smart contract is also used to determine a type of traffic rule violation behavior of the target vehicle based on the violation information.

Here, the smart contract generates the sub contract and periodically triggers the sub contract when determining that the type of behavior is a continuous behavior.

Due to the fact that the behavior of the target vehicle violating traffic rules can be non-continuous, such as running a red light, changing a lane on a solid line, or continuous, such as occupying an emergency lane, parking violation, etc. For a continuous behavior, the behavior of the target vehicle violating traffic rules will continue for a period of time.

Therefore, the monitoring vehicles will continue to monitor the target vehicle violating traffic rules and send violation information to the blockchain network. Therefore, it is also necessary to verify the violation information.

Here, when continuous behavior violates traffic rules, the smart contract can generate a sub contract and periodically trigger the sub contract to determine third vehicles to reverify the target vehicle's violation of traffic rules through the sub contract, and obtain reverification results of the third vehicles verifying whether the target vehicle has violated traffic rules.

In this case, due to the continuous behavior of the target vehicle, the location can change. Therefore, the method of determining the third vehicles in the sub contract can be determined based on the real-time location of the target vehicle, such as determining that a vehicle whose distance to the target vehicle is lower than the preset distance threshold is a third vehicle. If it is determined that the target vehicle does not violate traffic rules based on the reverification results, it can be determined that the violation of traffic rules by the target vehicle has ended. If it is determined that the target vehicle violates traffic rules based on the reverification results, it can be determined that the violation of traffic rules by the target vehicle has not yet ended. In the future, monitoring of the target vehicle can continue and verifying the violation of the target vehicle.

Here, if it is determined that the target vehicle does not violate traffic rules, the sub contract for verifying whether the target vehicle violates traffic rules can be deleted to save storage space.

Figure 6:
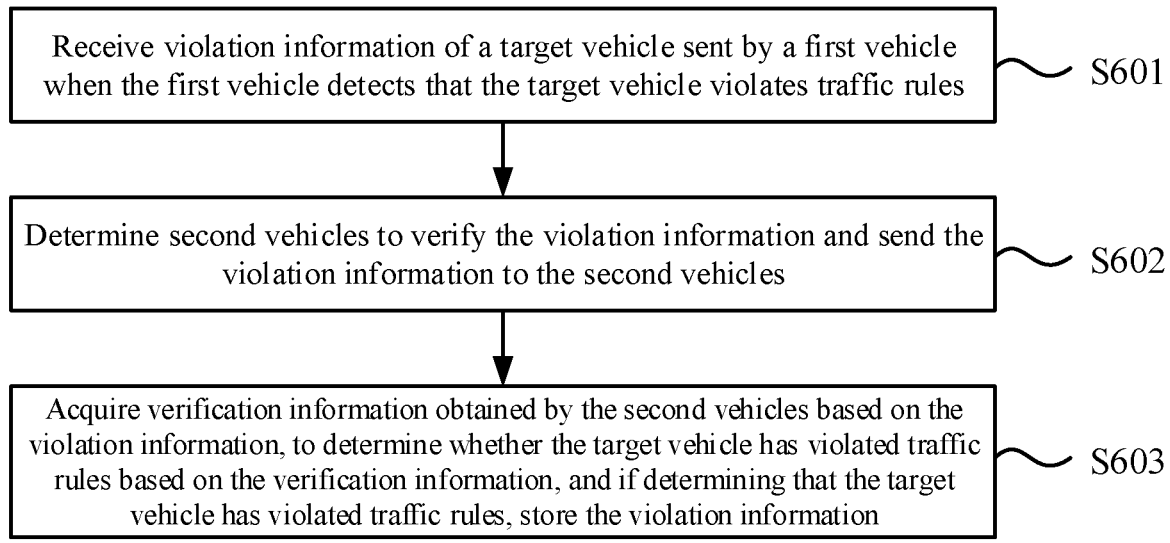
FIG. 6 is a schematic flowchart of a traffic information processing method illustrated according to an embodiment of the present disclosure.

FIG. 6 is a schematic flowchart of a traffic information processing method illustrated according to an embodiment of the present disclosure. The method shown in this embodiment can be applied to a server, which can communicate with a plurality of vehicles. The plurality of vehicles can periodically report current locations of the vehicles to the server, and a location can be associated with a time when the location is reported.

The role played by each vehicle in different scenarios can vary. The first vehicle plays a monitoring role and can be referred to as a monitoring vehicle, the second vehicle plays a verification role and can be referred to as a verification vehicle, the vehicle that violates traffic rules detected by the first vehicle can be referred to as a target vehicle, and vehicles that do not belong to the first, second, and target vehicles among the plurality of vehicles can be referred to as further vehicles.

In other scenarios, the identity of the vehicle can change with its role. For example, when the first vehicle violates traffic rules, the first vehicle can also serve as the target vehicle. When the second vehicle plays a monitoring role, the second vehicle can serve as the first vehicle, that is, the monitoring vehicle.

In the scenario shown in the following embodiments, the first vehicle plays a monitoring role, the second vehicle plays a verification role, and the target vehicle is a vehicle that violates traffic rules detected by the first vehicle. An exemplary explanation will be provided for the technical solution of the present disclosure.

As shown in FIG. 6, the traffic information processing method includes the following steps.

In step S601, it is received violation information of a target vehicle sent by a first vehicle when the first vehicle detects that the target vehicle violates traffic rules.

In step S602, second vehicles are determined to verify the violation information and send the violation information to the second vehicles.

In step S603, the verification information obtained by the second vehicles based on the violation information is acquired, to determine whether the target vehicle has violated traffic rules based on the verification information, and if it is determined that the target vehicle has violated traffic rules, the violation information is stored.

In one implementation, an image acquisition device can be installed in the vehicle, such as a driving recorder, a vehicle terminal equipped with a camera, etc. The vehicle can capture images of surrounding vehicles through the image acquisition device. For example, in the case of a driving recorder, it is generally installed in front of the vehicle to capture images in a traveling direction of the vehicle. After capturing images of surrounding vehicles, image acquisition devices can analyze the images to determine whether the vehicles in the images violate traffic rules.

For example, when the image acquisition device in the first vehicle captures an image containing vehicle A, it can determine whether vehicle A violates traffic rules based on a relationship between vehicle A and the environment. For example, when determining that vehicle A crosses an intersection with a red traffic light on, it can be determined that vehicle A violates traffic rules, specifically by running a red light. For example, when determining that vehicle A crosses a solid line between adjacent lanes, it can be determined that vehicle A violates traffic rules, and the specific violation is a solid line lane change. For example, when determining that vehicle A is driving in an emergency lane, it can be determined that vehicle A violates traffic rules, specifically by occupying the emergency lane. For example, when determining that vehicle A is parked in a prohibited area, it can be determined that vehicle A violates traffic rules, and the specific violation is illegal parking.

The above is only an exemplary description of several situations where vehicle A violates traffic rules. For other situations where vehicle A violates traffic rules, image acquisition devices can also capture and determine them.

When determining that vehicle A violates traffic rules, it can be determined that vehicle A is the target vehicle and obtain violation information of the target vehicle. The violation information should at least include identity information of vehicle A, such as a license plate number of vehicle A, and further information, such as the violation behavior and an image of the target vehicle's violation captured by the first vehicle.

Then the first vehicle can send the violation information to the server, which can determine the second vehicles to verify the violation information and send the violation information to the second vehicles. For example, the server can send a verification request to the second vehicles, which carries the violation information. Here, the violation information sent to the second vehicle should at least include the identity information of the target vehicle, such as the license plate number of the target vehicle.

After receiving the violation information, a second vehicle can verify the violation information, such as verifying whether the violation information is true. The verification result can include two situations: yes and no, and can then report the verification result to the server, for example, as a verification response to a verification request.

Here, the second vehicle can also verify the violation information through the image acquisition device equipped on the vehicle. For example, the image can be captured through the image acquisition device, and then it can be determined whether the target vehicle exists in the captured image. For example, the license plate number of the vehicle in the image can be determined, and it can be determined whether there is a license plate number the same with license plate number of the target vehicle. If so, it can be determined that there is a target vehicle in the image. If it does not exist, it is determined that the target vehicle does not exist in the image.

In determining the presence of the target vehicle in the image, it is possible to further determine whether the target vehicle has violated traffic rules. Here, the second vehicle determines whether the target vehicle has violated traffic rules in a similar way as the first vehicle determines whether the vehicle has violated traffic rules, which will not be repeated here. The verification result is Yes when the second vehicle determines that the target vehicle has violated traffic rules, and No when the target vehicle has not violated traffic rules.

After receiving verification results from a plurality of second vehicles, the server can determine whether the target vehicle has violated traffic rules based on the received verification results. For example, it can be determined based on a proportion of verification results that are yes. If the proportion of verification results that are yes is higher than or equal to the preset proportion threshold, it can be determined that the target vehicle has indeed violated traffic rules. For example, if the proportion threshold is 60%, and 10 second vehicles are determined, if 7 verification results are Yes, the proportion of verification results being Yes reaches 70%, which is higher than 60% of the proportion, then it can be determined that the target vehicle has violated traffic rules, and the violation information of the target vehicle can be stored for subsequent acquisition by the target vehicle.

According to the embodiments of the present disclosure, target vehicles that violate traffic rules can be determined through mutual monitoring between vehicles. Due to the variety of road sections where vehicles travel and the fact that vehicles can move, setting cameras on fixed road sections to determine vehicles that violate traffic rules can monitor more vehicles in more road sections, increasing the scope of monitoring vehicle violations of traffic rules, And the cost is relatively low.

Figure 7:
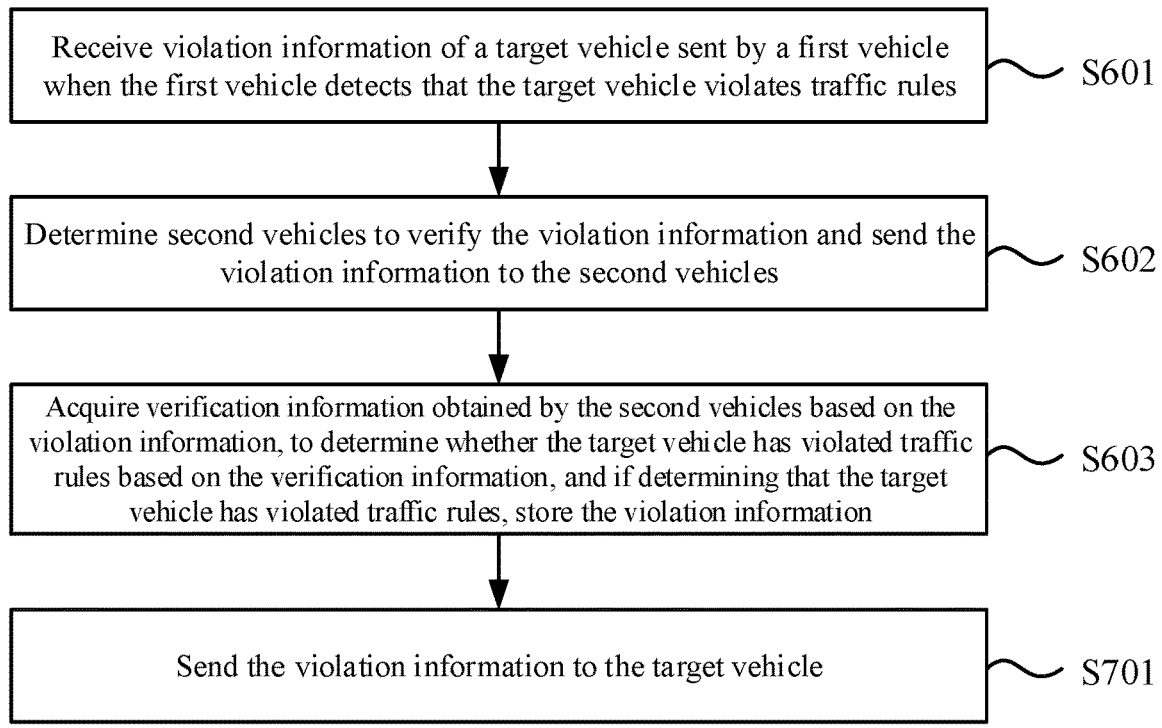
FIG. 7 is a schematic flowchart of another traffic information processing method illustrated according to an embodiment of the present disclosure.

FIG. 7 is a schematic flowchart of another traffic information processing method shown according to the embodiment of the present disclosure. As shown in FIG. 7, the method further includes the following steps.

In step S701, violation information is sent to the target vehicle.

In one implementation, after storing the violation information, the server can send the violation information to the target vehicle, for example, it can automatically send the violation information to the target vehicle, or it can send the violation information to the target vehicle upon receiving an acquisition request sent by the target vehicle.

Here, the violation information sent to the target vehicle, at least including the identity information and violation behavior of the target vehicle, can also include image information of the target vehicle's violation, so that the target vehicle can determine its own violation situation based on the violation information and pay corresponding fines.

Figure 8:
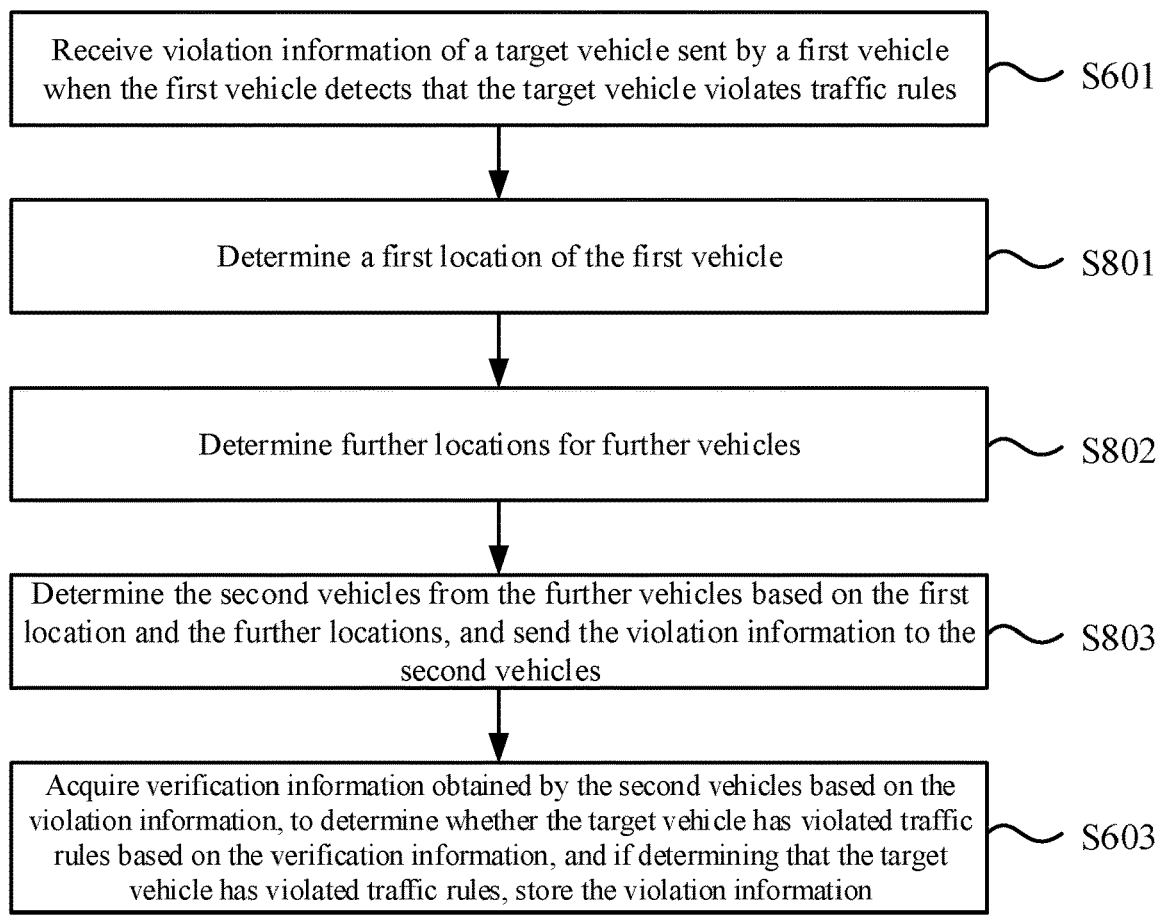
FIG. 8 is a schematic flowchart of another traffic information processing method illustrated according to an embodiment of the present disclosure.

FIG. 8 is a schematic flowchart of another traffic information processing method illustrated according to the embodiment of the present disclosure. As shown in FIG. 8, the method further includes the following steps.

In step S801, a first location of the first vehicle is determined.

In step S802, further locations of further vehicles are determined.

Here, determining second vehicles to verify the violation information includes the following steps.

In step 803, the second vehicles are determined from the further vehicles based on the first location and the further locations.

In one implementation, a plurality of vehicles can periodically report their locations to the server, and the locations are associated with the times when the locations are reported, allowing the server to determine the real-time location of each vehicle. Here, in order to avoid user privacy leakage, the locations periodically reported by vehicles can be rough locations, such as those with accuracy lower than a preset accuracy threshold.

When the first vehicle sends the violation information of the target vehicle to the server, it can also report the first location of the first vehicle itself. To ensure accurate determination of the second vehicles, the reported first location can be a precise location, such as a location with an accuracy higher than the preset accuracy threshold.

After receiving the violation information about the target vehicle reported by the first vehicle, the server can determine, from further vehicles, vehicles that are relatively close to the first vehicle as the second vehicles. For example, a location difference between a second location and the first location can be calculated, and a vehicle corresponding to a second location has a location difference lower than a preset distance threshold can be determined as the second vehicle. Based on this, it can be ensured that the determined second vehicle is closer to the first vehicle, so that the second vehicle can capture images containing the target vehicle relatively clearly, and accurately verify whether the target vehicle violates traffic rules.

In one implementation, the method further includes:
determining a traveling direction of the first vehicle;
determining the second vehicles from the further vehicles includes:
determining, from further locations, vehicles having a distance to the first location lower than a preset distance threshold and a traveling direction that meets a preset relationship with the traveling direction of the first vehicle, as the second vehicles.

When the first vehicle sends the violation information of the target vehicle to the server, the first vehicle can also report the traveling direction of the first vehicle. When the server determines the second vehicle from further vehicles, in addition to considering the distance between vehicles, it can also consider the traveling direction of the vehicle.

Due to the fact that image acquisition devices in vehicles are generally set at the front of the vehicle, mainly capturing images in the traveling direction of the vehicle, when determining the second vehicles, it is possible to determine, from vehicles corresponding to further nodes, vehicles having a traveling direction that meets a preset relationship (for example, an angle lower than a preset angle threshold) with the traveling direction of the first vehicle and having a distance to the first location lower than a preset distance threshold, as the second vehicles. Based on this, it can not only ensure that the determined second vehicles are close to the first vehicle, but also ensure that the target vehicle is located in the area corresponding to the traveling direction of the second vehicles, so that the second vehicles can relatively capture images containing the target vehicle, and accurately verify whether the target vehicle violates traffic rules.

In one implementation, the verification information includes a verification result of the second vehicle determining whether the target vehicle has violated traffic rules.

In one implementation, the verification information includes image information captured by the second vehicle which contains the target vehicle. The method further includes:

obtaining verification results as whether the target vehicle has violated traffic rules based on the image information.

In one implementation, the second vehicles can analyze the image containing the target vehicle after capturing the image, to determine whether the target vehicle has violated traffic rules, and then report the verification result to the server.

However, in some cases, the processing capability of the second vehicle is relatively weak, merely can determine whether the image contains the target vehicle, and cannot analyze to determine whether the target vehicle violates traffic rules. In this case, the second vehicle can report the captured image information containing the target vehicle as verification information to the server, and the server will analyze the image, to determine whether the target vehicle has violated traffic rules to obtain the verification result.

In one implementation, determining whether the target vehicle has violated traffic rules based on the verification information includes:

determining, from the verification results, a first number of verification results which determine that the target vehicle has violated traffic rules, and determining that the target vehicle violates traffic rules when the first number is higher than a first number threshold.

Upon receiving the verification results, the server can determine whether the target vehicle has violated traffic rules based on the verification results. For example, it can be determined based on the number of verification results that are yes. If the number of verification results that are yes is higher than or equal to the first number threshold, it can be determined that the target vehicle has indeed violated traffic rules. For example, if the first number threshold is 6, and 10 second vehicles are determined, if 7 verification results are yes, it is higher than the first number threshold of 6, it can be determined that that the target vehicle violates traffic rules, and the violation information of the target vehicle can be stored for subsequent acquisition by the target vehicle.

In one implementation, determining whether the target vehicle has violated traffic rules based on the verification information includes:

determining, from the verification results, a second number of verification results which determine that a probability of the target vehicle violating traffic rules is higher than a probability threshold, and determining that the target vehicle violating traffic rules when the second number is higher than a second number threshold.

Due to the different locational relationships between second vehicles at different locations and the target vehicle, the captured images containing the target vehicle will also vary, and the probability of accurate verification results based on the images will also vary. For example, when verifying whether the target vehicle has violated traffic rules, the generated verification results can be probabilities, such as the probability of violating traffic rules.

After receiving the verification results, the server can determine whether the target vehicle has violated traffic rules based on the received verification results. For example, it can be determined based on the second number of verification results which determine that a probability of the target vehicle violating traffic rules is higher than a probability threshold. If the second number is higher than or equal to the second number threshold, it can be determined that the target vehicle has indeed violated traffic rules, for example, the probability threshold is 60%, and the second number threshold is 5. When 10 second vehicles are determined, if 6 verification results has the probability of the target vehicle violating traffic rules higher than 60%, the second number is 6, and the second number threshold is higher than 5, then it can be determined that the violation of traffic rules by the target vehicle. The violation information of the target vehicle can be stored for subsequent acquisition by the target vehicle.

In one implementation, the method further includes:

determining whether the violation information about the target vehicle has been received for a first time within a preset time range at a current time.

Here, if receiving violation information about the target vehicle for the first time, second vehicles are determined to verify the violation information; otherwise, the violation information is ignored.

In one implementation, due to the presence of a large number of vehicles on the road, there may be a plurality of first vehicles detected as violating traffic rules by the target vehicle. The plurality of first vehicles can report violation information to the server. However, if the server processes each violation information, it will result in repeated processing of the same violation information and waste of resources.

Therefore, in this implementation, after receiving the violation information reported by the first vehicle, the server can first determine whether the violation information about the target vehicle has been received for the first time within the preset time range at a current time, such as from the current time to the period before the current time. If the violation information about the target vehicle has been received for the first time, further operations can be performed, to determine second vehicles to verify the violation information. If the violation information of the target vehicle is not received for the first time, it indicates that the first vehicle has already reported the violation information of the target vehicle to the server before this, and the violation information received this time is probably the same as the violation information received before. Therefore, the violation information reported this time can be ignored to avoid resource waste caused by repeatedly processing the same violation information.

Figure 9:
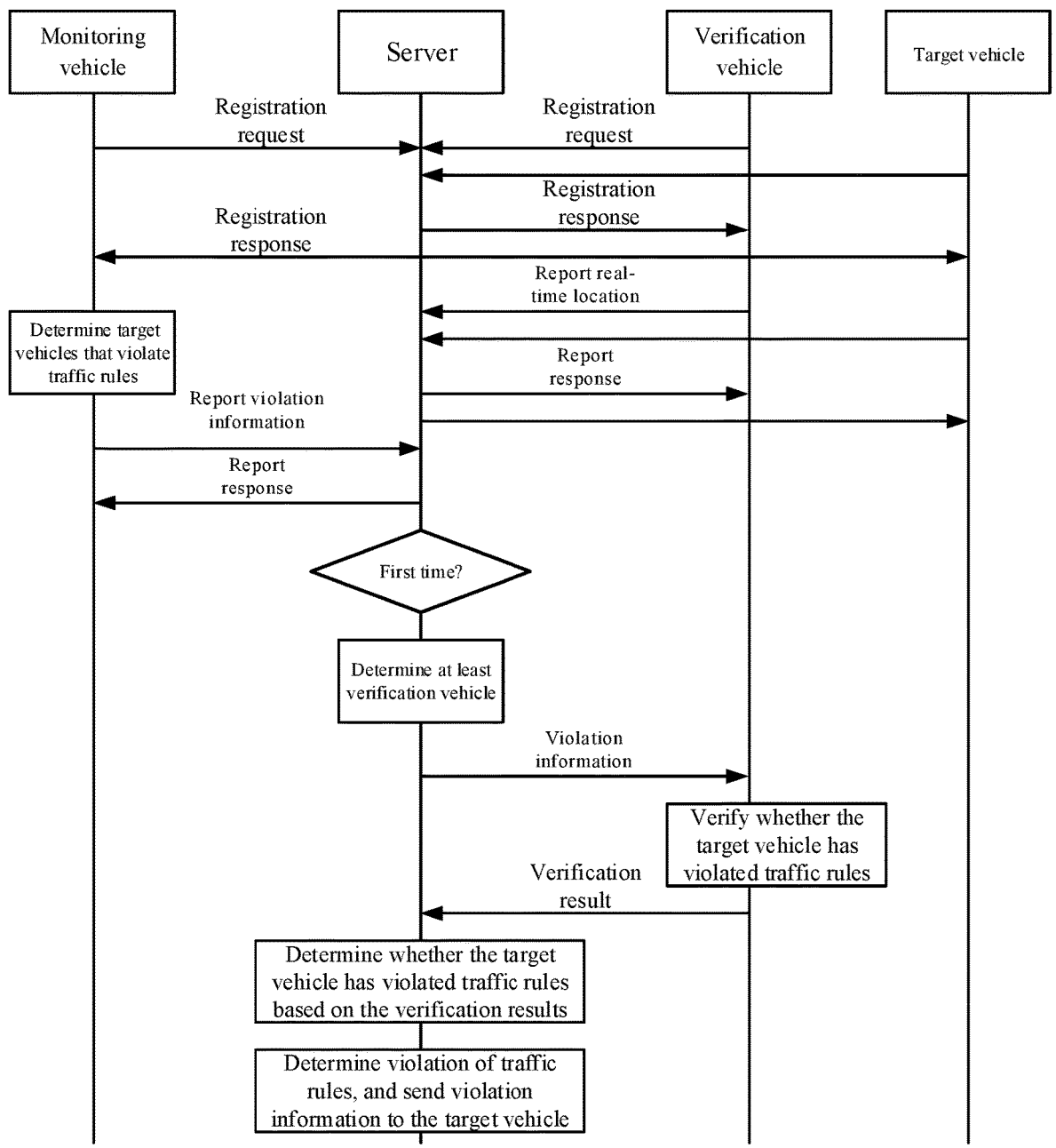
FIG. 9 is a schematic diagram of an interaction between a server and a vehicle according to an embodiment of the present disclosure.

FIG. 9 is a schematic diagram of an interaction between a server and a vehicle according to an embodiment of the present disclosure.

As shown in FIG. 9, a plurality of vehicles first need to register with the server, such as sending a registration request to the server, and the server returns a registration response to indicate whether the registration is successful.

The monitoring vehicle (also known as the first vehicle) can record the violation information of the target vehicle when it violates traffic rules, and report the violation information to the server. It can also report the identity information, location, etc. of the monitoring vehicle, which can include the identity information and violation behavior of the target vehicle. The server can return a report response indicating whether the reported violation information has been received.

Upon receiving the violation information, the server can first determine whether the violation information about the target vehicle has been received for the first time within the preset time range at a current time; determine second vehicles (i.e. the second vehicle) to verify the violation information of the target vehicle upon receiving the violation information for the first time; otherwise, the violation information is ignored. The vehicle can periodically report real-time location to the server, and the server can return a report response to indicate whether the reported real-time location has been received. The server can determine the verification vehicle based on the relationship between the real-time location reported by the vehicle and the location of the monitoring vehicle.

After determining the verification vehicles, the server can carry the violation information in the verification request and send the verification request to the verification vehicles. After the verification vehicle receives the violation information, the verification vehicle can verify the violation information, such as verifying whether the target vehicle is in violation, and generate a verification result to be carried in a verification response and sent the verification response to the server.

Figure 10:
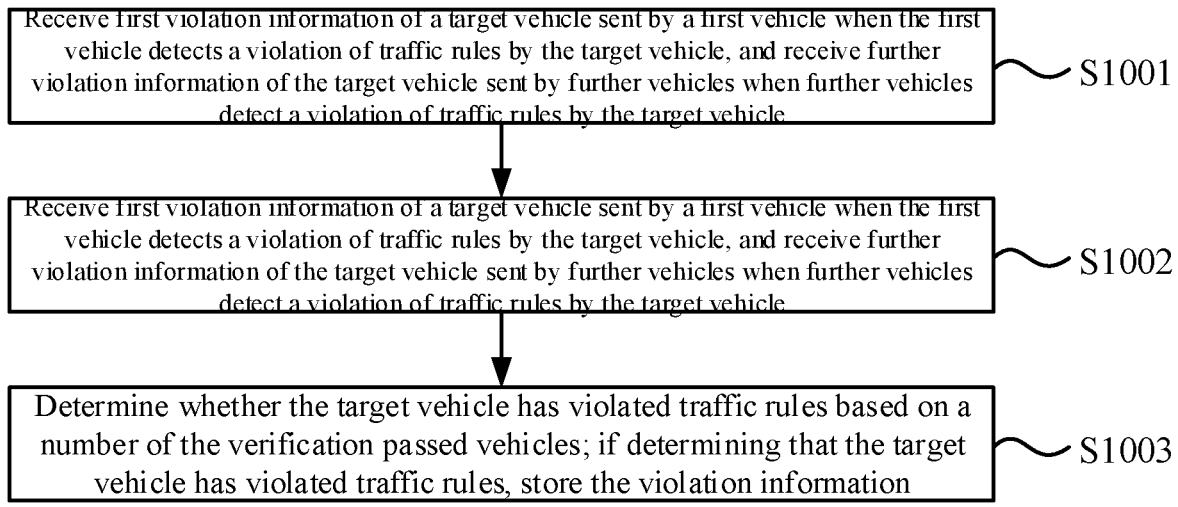
FIG. 10 is a schematic flowchart of a traffic information processing method illustrated according to an embodiment of the present disclosure.

FIG. 10 is a schematic flowchart of a traffic information processing method illustrated according to an embodiment of the present disclosure. The method shown in this embodiment can be applied to a server, which can communicate with a plurality of vehicles. The plurality of vehicles can periodically report the current location of the vehicle to the server, and the location can be associated with the time when the location is reported.

The role played by each vehicle in different scenarios can vary. The first vehicle plays a monitoring role and can be referred to as a monitoring vehicle. The vehicle that violates traffic rules detected by the first vehicle can be referred to as a target vehicle, and further vehicles that violate traffic rules detected by the target vehicle can be referred to as further vehicles.

In other scenarios, the identity of the vehicle can change with its role. For example, when the first vehicle violates traffic rules, the first vehicle can also serve as the target vehicle. When the target vehicle plays a monitoring role, the target vehicle can serve as the first vehicle, that is, the monitoring vehicle.

In the scenario shown in the following embodiments, the first vehicle mainly plays a monitoring role, and the target vehicle is a vehicle that violates traffic rules detected by the first vehicle. An exemplary explanation will be provided for the technical solution of the present disclosure.

As shown in FIG. 10, the traffic information processing method includes the following steps.

In step S1001, it is received first violation information of a target vehicle sent by a first vehicle when the first vehicle detects a violation of traffic rules by the target vehicle, and it is received further violation information of the target vehicle sent by further vehicles when further vehicles detect a violation of traffic rules by the target vehicle.

In step S1002, the first violation information is verified based on the further violation information, to determine verification passed vehicles corresponding to further violation information, from the further violation information, based on which the verification on the first violation information has been passed.

In step S1003, it is determined whether the target vehicle has violated traffic rules based on a number of the verification passed vehicles. If it is determined that the target vehicle has violated traffic rules, the violation information is stored.

In one implementation, an image acquisition device can be installed in the vehicle, such as a driving recorder, a vehicle terminal equipped with a camera, etc. The vehicle can capture images of surrounding vehicles through the image acquisition device. For example, in the case of a driving recorder, it is generally installed in front of the vehicle to capture images in the traveling direction of the vehicle. After capturing images of surrounding vehicles, image acquisition devices can analyze the images to determine whether the vehicle in the images violates traffic rules.

For example, when the image acquisition device in the first vehicle captures images containing vehicle A, it can determine whether vehicle A violates traffic rules from the relationship between vehicle A and the environment. For example, when determining that vehicle A crosses an intersection with a red traffic light on, it can be determined that vehicle A violates traffic rules, specifically by running a red light. For example, when determining that vehicle A crosses a solid line between adjacent lanes, it can be determined that vehicle A violates traffic rules, and the specific violation is a solid line lane change; For example, when determining that vehicle A is driving in an emergency lane, it can be determined that vehicle A violates traffic rules, specifically by occupying the emergency lane. For example, when determining that vehicle A is parked in a prohibited area, it can be determined that vehicle A violates traffic rules, and the specific violation is illegal parking.

The above is only an exemplary description of several situations where vehicle A violates traffic rules. For other situations where vehicle A violates traffic rules, image acquisition devices can also capture and determine them.

When determining that vehicle A violates traffic rules, it can be determined that vehicle A is the target vehicle and violation information of the target vehicle is obtained. The violation information should at least include the identity information of vehicle A, such as the license plate number of vehicle A, and further information, such as the violation behavior and the image of the target vehicle's violation captured by the first vehicle. Then the first vehicle can send the violation information to the server.

Vehicles other than the first vehicle can also perform the above monitoring actions. For example, when further vehicles detect that the target vehicle violates traffic rules, they can send further violation information of the target vehicle to the server.

The server can receive both the first violation information about the target vehicle reported by the first vehicle and further violation information about the target vehicle reported by further vehicles. In this case, the server can verify the first violation information through further violation information to determine whether the target vehicle is in violation.

For example, one can search in further violation information for violation information about the target vehicle in the vicinity of the time and location the first violation information, and then determine, from the found violation information, violation information that determines the target vehicle's violation. The determined violation information is the further violation information that has been verified for the first violation information, and the vehicle corresponding to this further violation information can be called a verification passed vehicle.

Further, it is possible to determine whether the target vehicle has violated traffic rules based on the number of verification passed vehicles. For example, if the number of target vehicles exceeds a third number threshold, it can be determined that the target vehicle has violated traffic rules and the violation information can be stored.

According to the embodiments of the present disclosure, the target vehicle that violates traffic rules can be determined through mutual monitoring between vehicles. Due to the variety of road sections where vehicles travel and the fact that vehicles can move, compared to providing cameras on fixed road sections to determine vehicles that violate traffic rules, more vehicles in road sections can be monitored, increasing the scope of monitoring vehicle violations of traffic rules, and the cost is relatively low.

Figure 11:
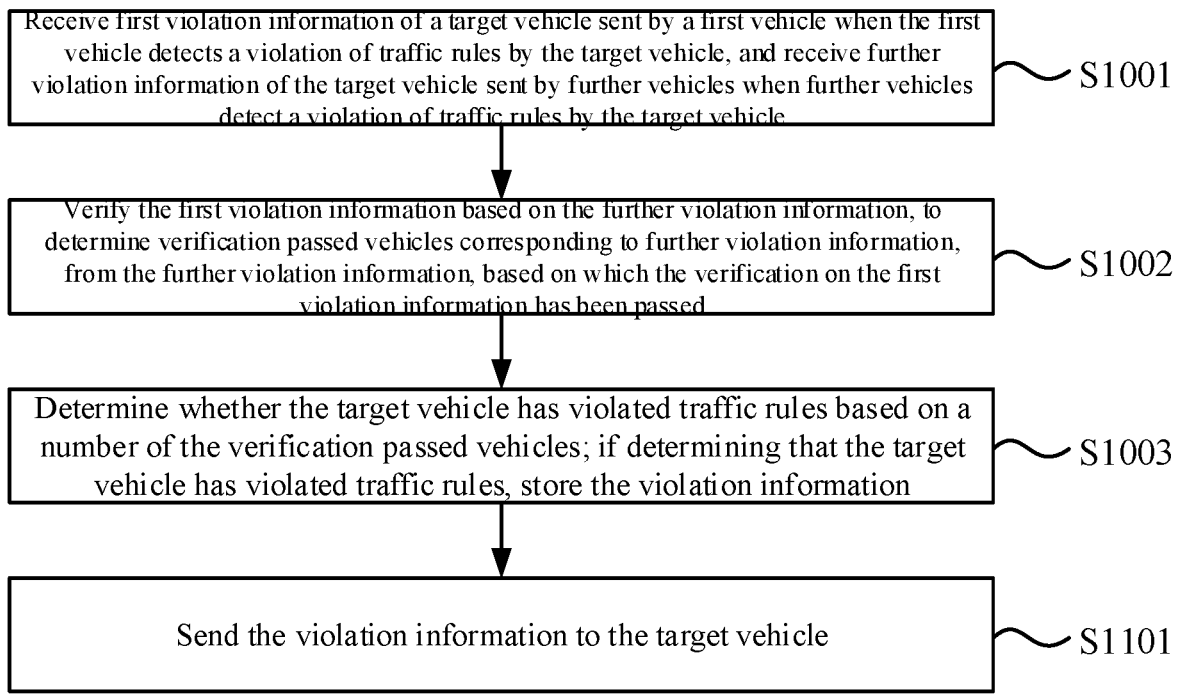
FIG. 11 is a schematic flowchart of another traffic information processing method illustrated according to an embodiment of the present disclosure.

FIG. 11 is a schematic flowchart of another traffic information processing method shown according to an embodiment of the present disclosure. As shown in FIG. 11, the method further includes the following steps.

In step S1101, the violation information is sent to the target vehicle.

In one implementation, after storing the violation information, the server can send the violation information to the target vehicle, for example, it can automatically send the violation information to the target vehicle, or it can send the violation information to the target vehicle upon receiving an acquisition request sent by the target vehicle.

Here, the violation information sent to the target vehicle includes at least the identity information and violation behavior of the target vehicle, and can also include image information of the target vehicle's violation, so that the target vehicle can determine its own violation situation based on the violation information and pay corresponding fines.

Figure 12:
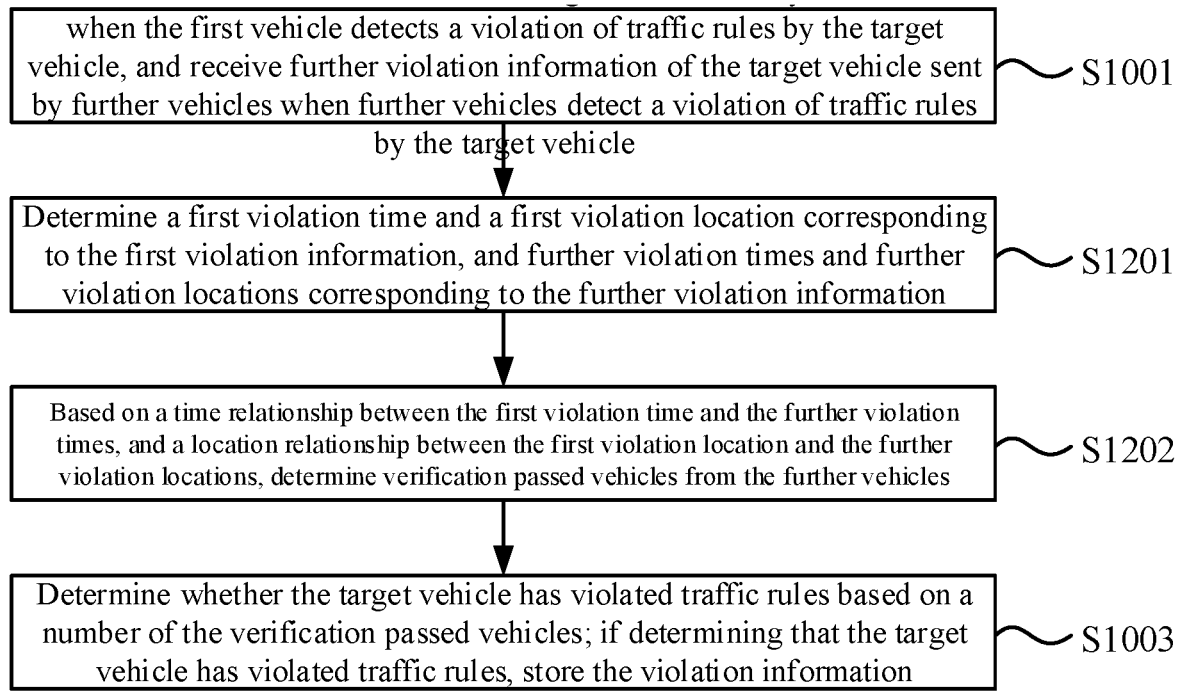
FIG. 12 is a schematic flowchart of another traffic information processing method illustrated according to an embodiment of the present disclosure.

FIG. 12 is a schematic flowchart of another traffic information processing method shown according to an embodiment of the present disclosure. As shown in FIG. 12, verifying the first violation information based on the further violation information, to determine verification passed vehicles corresponding to further violation information, from the further violation information, based on which the verification on the first violation information has been passed includes the following steps.

In step S1201, a first violation time and a first violation location corresponding to the first violation information, and further violation times and further violation locations corresponding to the further violation information are determined.

In step S1202, based on a time relationship between the first violation time and the further violation times, and a location relationship between the first violation location and the further violation locations, verification passed vehicles are determined from the further vehicles.

In one implementation, the first violation information may include the first violation event detected by the first vehicle as a violation of traffic rules by the target vehicle and the first violation location at which the target violation occurred. Similarly, further violation information may include further violation events detected by further vehicles as a violation of traffic rules by the target vehicle and further violation locations at which the target violation occurred.

Furthermore, the time relationship between the first violation time and the further violation times, and the location relationship between the first violation location and the further violation locations, can be determined, and the verification passed vehicles can be determined from further vehicles based on the time relationship and location relationship.

For example, further violation times with a relatively close time interval (such as lower than a preset time interval) to the first violation time and further violation locations with a relatively small distance (such as lower than a preset distance threshold) to the first violation location can be determined in further violation locations. Furthermore, it is possible to find further violations that have been determined and further violations that belong to the same location.

The further violation information found correspond to further violation times when further vehicles monitor the target vehicle violating traffic rules are relatively close to the first violation time when the first vehicle detects the target vehicle violating traffic rules, and the further violation information found correspond to further violation locations where further vehicles monitor the target vehicle violating traffic rules are relatively close to the first violation location where the first vehicle detects the target vehicle violating traffic rules. Therefore, it can be determined that both the further vehicles and the first vehicle have detected violations of traffic rules by the target vehicle at the same time and location. Therefore, it can be considered that the verification on the first violation information has been passed. Furthermore, it can be determined that the vehicles corresponding to the found further violations are verification passed vehicles.

In one implementation, the method further includes:
determining whether the violation information about the target vehicle has been received for a first time within a preset time range at a current time;
wherein upon receiving violation information about the target vehicle for the first time, the first violation information is verified based on the further violation information to determine vehicles corresponding to the further violation information, from the further violation information, based on which the verification on the first violation information has been passed; otherwise, the first violation information is ignored.

In one implementation, due to the presence of a large number of vehicles on the road, there may be a plurality of first vehicles detected as violating traffic rules by the target vehicle. The plurality of first vehicles can report violation information to the server. However, if the server processes each violation information, it will result in repeated processing of the same violation information and waste of resources.

Therefore, in this implementation, after receiving the violation information reported by the first vehicle, the server can first determine whether the violation information about the target vehicle has been received for the first time within the preset time range at a current time, such as from the current time to the period before the current time. If the violation information about the target vehicle has been received for the first time, further operations can be performed, to verify the first violation information based on the further violation information to determine vehicles corresponding to the further violation information, from the further violation information, based on which the verification on the first violation information has been passed. If the violation information of the target vehicle is not received for the first time, it indicates that the first vehicle has already reported the violation information of the target vehicle to the server before this, and the violation information received this time is probably the same as the violation information received before. Therefore, the violation information reported this time can be ignored to avoid resource waste caused by repeatedly processing the same violation information.

Figure 13:
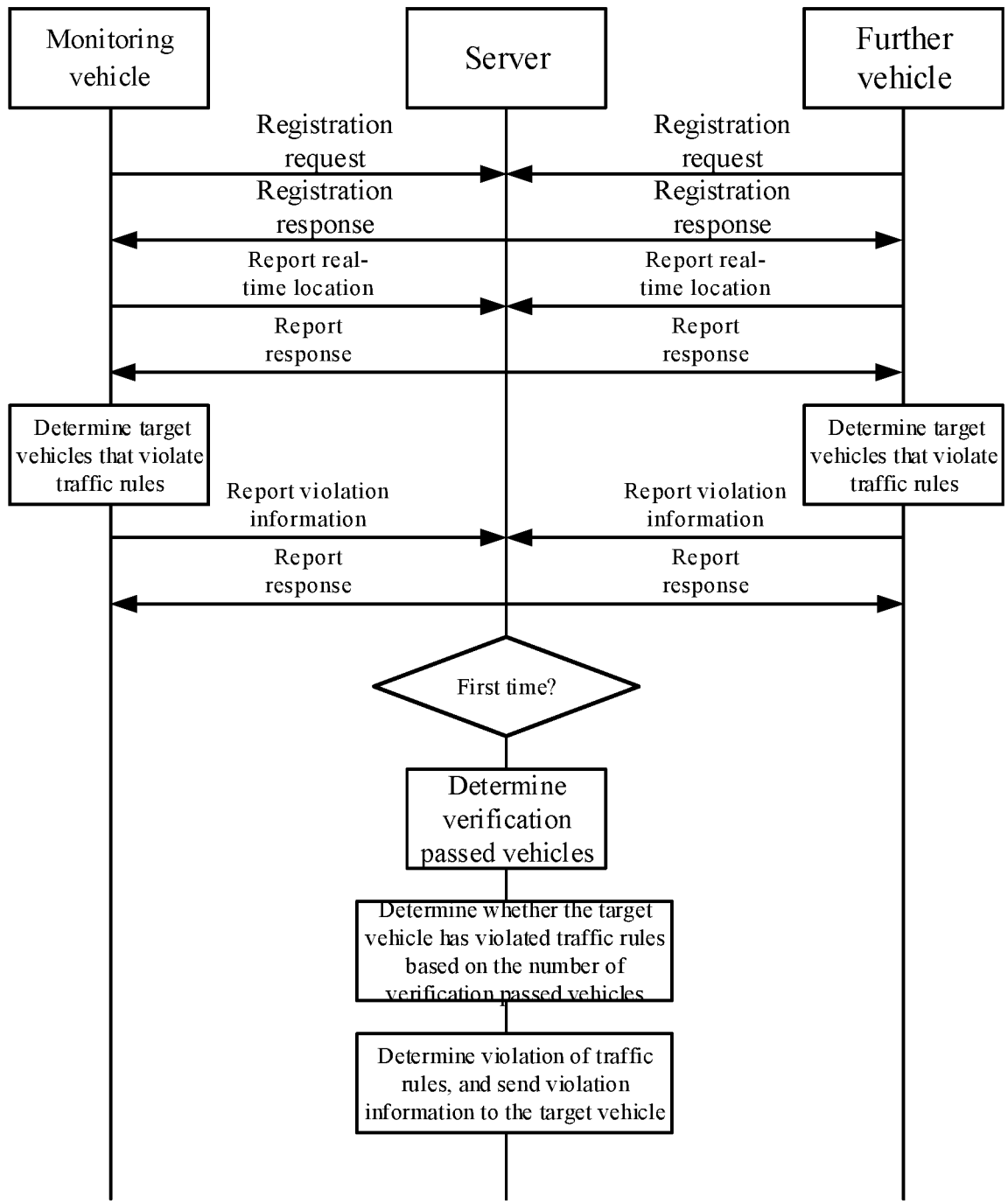
FIG. 13 is a schematic diagram of an interaction between a server and a vehicle according to an embodiment of the present disclosure.

FIG. 13 is a schematic diagram of an interaction between a server and a vehicle according to an embodiment of the present disclosure.

As shown in FIG. 13, a plurality of vehicles first need to register with the server, such as sending a registration request to the server, and the server returns a registration response to indicate whether the registration is successful.

The monitoring vehicle (also known as the first vehicle) can record the violation information of the target vehicle when it violates traffic rules, and report the violation information to the server. The violation information can include the identity information of the target vehicle, such as the license plate number, and the first violation location and first violation event when the target vehicle violation is detected. The server can return a report response indicating whether the reported violation information has been received. Similarly, further vehicles can also record the violation information of the target vehicle and report the violation information to the server when the target vehicle violates traffic rules. The violation information can include the identity information of the target vehicle, such as the license plate number, and further violation locations and events when the target vehicle violates the rules.

Upon receiving the violation information, the server can first determine whether the violation information about the target vehicle has been received for the first time within the preset time range at a current time. Upon receiving violation information about the target vehicle for the first time, further operations can be carried out to verify the first violation information based on the further violation information, in order to determine vehicles corresponding to the further violation information, from further violation information, based on which the verification on the first violation information has been passed. Otherwise, the violation information is ignored. The vehicle can periodically report real-time location to the server, and the server can return a report response to indicate whether the reported real-time location has been received.

After determining the number of vehicles according to which the verification has been passed, the server can further determine the number of vehicles according to which the verification has been passed. If the number is large, such as exceeding a third number threshold, the target vehicle can be determined to have violated traffic rules, and the verification result can be generated and carried in the verification response to be sent to the server.

Corresponding to the implementation of the traffic information processing method, the present disclosure also provides an implementation of a traffic information processing apparatus.

An implementation of the present disclosure also provides a traffic information processing apparatus, which can be applied to a blockchain network, the blockchain network including a plurality of vehicles and a regulatory agency. The plurality of vehicles can be taken as nodes in the blockchain network, and smart contracts are deployed in the nodes. Each vehicle can periodically send transaction information to the blockchain network, carrying a current location of the vehicle. Such location and a location carried by transaction information in subsequent implementations can be associated with a time when the transaction information was sent.

In one implementation, the apparatus includes one or more processors configured to perform:
receiving transaction information sent by a first vehicle, the transaction information carrying violation information of the target vehicle detected by the first vehicle;
triggering a smart contract based on the transaction information, the smart contract being used to determine second vehicles to verify the transaction information, and sending the violation information to the second vehicles such that the second vehicles generate verification results based on the violation information;
determining whether the target vehicle has violated traffic rules based on the verification results; if determining that the target vehicle has violated traffic rules, storing the violation information in the blockchain network.

In one implementation, the processor is further configured to perform: sending the violation information to the target vehicle.

In one implementation, the transaction information further includes a first location of the first vehicle, and the processor is further configured to perform:
determining second locations of vehicles corresponding to further nodes other than a node corresponding to the first vehicle in the blockchain network.

Here, the smart contract is used to determine the second vehicles from the vehicles corresponding to the further nodes based on the first location and the second locations.

In one implementation, the transaction information further includes a traveling direction of the first vehicle;

Here, the smart contract is used to determine, from the vehicles corresponding to the further nodes, vehicles having a distance to the first location lower than a preset distance threshold and a traveling direction that meets a preset relationship with the traveling direction of the first vehicle, as the second vehicles.

In one implementation, the smart contract is used to determine, from the verification results, a first number of verification results which determine that the target vehicle has violated traffic rules, and to determine that the target vehicle has violated traffic rules when the first number is higher than a first number threshold.

In one implementation, the smart contract is used to determine, from the verification results, a second number of verification results which determine that a probability of the target vehicle violating traffic rules is higher than a probability threshold, and to determine that the target vehicle has violated traffic rules when the second number is higher than a second number threshold.

In one implementation, the smart contract is used to generate a sub contract and periodically trigger the sub contract.

Here, the sub contract is used to determine third vehicles to reverify the transaction information at a triggering time of the sub contract, and send the violation information to the third vehicles such that the third vehicles generate reverification results based on the violation information.

In one implementation, the smart contract is also used to determine a type of traffic rule violation behavior of the target vehicle based on the violation information.

Here, the smart contract generates the sub contract and periodically triggers the sub contract when determining that the type of behavior is a continuous behavior.

An embodiment of the present disclosure also provides a traffic information processing apparatus, which can be applied to a server. The server can communicate with a plurality of vehicles, and the plurality of vehicles can periodically report the current locations of the vehicles to the server. The location can be associated with the times when the locations are reported.

In one implementation, the apparatus includes one or more processors configured to perform:
receiving violation information of a target vehicle sent by a first vehicle when the first vehicle detects that the target vehicle violates traffic rules;
determining second vehicles to verify the violation information and sending the violation information to the second vehicles.
acquiring verification information obtained by the second vehicles based on the violation information, to determine whether the target vehicle has violated traffic rules based on the verification information, and if determining that the target vehicle has violated traffic rules, storing the violation information.

In one implementation, the processor is further configured to perform:
  sending the violation information to the target vehicle.

In one implementation, the processor is further configured to perform:
  determining a first location of the first vehicle;
  determining further locations of further vehicles;
  wherein the processor is configured to perform:
  determining second vehicles from the further vehicles based on the first location and the further locations.

In one implementation, the processor is further configured to perform:
  determining a traveling direction of the first vehicle;
  determining second vehicles from the further vehicles based on the first location and the further locations includes:
  determining, from further locations, vehicles having a distance to the first location lower than a preset distance threshold and a traveling direction that meets a preset relationship with the traveling direction of the first vehicle, as the second vehicles.

In one implementation, the verification information includes a verification result of the second vehicle determining whether the target vehicle has violated traffic rules.

In one implementation, the verification information includes image information captured by the second vehicle which contains the target vehicle;
  The processor is also configured to perform:
  obtaining verification results as whether the target vehicle has violated traffic rules based on the image information.

In one implementation, the processor is configured to perform:
  determining, from the verification results, a first number of verification results which determine that the target vehicle has violated traffic rules, and determining that the target vehicle violates traffic rules when the first number is higher than a first number threshold.

In one implementation, the processor is configured to perform:
  determining, from the verification results, a second number of verification results which determine that a probability of the target vehicle violating traffic rules is higher than a probability threshold, and determining that the target vehicle violating traffic rules when the second number is higher than a second number threshold.

In one implementation, the processor is further configured to perform:
  determining whether the violation information about the target vehicle has been received for a first time within a preset time range at a current time.

Here, if receiving violation information about the target vehicle for the first time, determining second vehicles to verify the violation information; otherwise, ignoring the violation information.

An embodiment of the present disclosure also provides a traffic information processing apparatus, which can be applied to a server. The server can communicate with a plurality of vehicles, and the plurality of vehicles can periodically report the current locations of the vehicles to the server. The locations can be associated with the times when the locations are reported.

In one implementation, the apparatus includes one or more processors configured to perform:
  receiving first violation information of a target vehicle sent by a first vehicle when the first vehicle detects a violation of traffic rules by the target vehicle, and receiving further violation information of the target vehicle sent by further vehicles when further vehicles detect a violation of traffic rules by the target vehicle;
  verifying the first violation information based on the further violation information, to determine verification passed vehicles corresponding to further violation information, from the further violation information, based on which the verification on the first violation information has been passed;
  determining whether the target vehicle has violated traffic rules based on a number of the verification passed vehicles; if determining that the target vehicle has violated traffic rules, storing the violation information.

In one implementation, the processor is configured to perform:
  sending the violation information to the target vehicle.

In one implementation, verifying the first violation information based on the further violation information, to determine verification passed vehicles corresponding to further violation information, from the further violation information, based on which the verification on the first violation information has been passed includes:
  determining a first violation time and a first violation location corresponding to the first violation information, and further violation times and further violation locations corresponding to the further violation information;
  based on a time relationship between the first violation time and the further violation times, and a location relationship between the first violation location and the further violation locations, determining a verification passed vehicle from the further vehicles.

In one implementation, the processor is further configured to perform:
  determining whether the violation information about the target vehicle has been received for a first time within the preset time range at a current time;
  wherein upon receiving violation information about the target vehicle for the first time, the first violation information is verified based on the further violation information, to determine vehicles corresponding to the further violation information, from the further violation information, based on which the verification on the first violation information has been passed; otherwise, the first violation information is ignored.

Regarding the apparatuses in the above embodiments, the specific ways in which each module performs operations have been described in detail in the relevant method embodiments, which will not be elaborated here.

For apparatus embodiments, since they basically correspond to method embodiments, please refer to the partial explanation of method embodiments for relevant information. The apparatus embodiments described above are only schematic, where the modules described as separate components can be or may not be physically separated, and the components displayed as modules can be or may not be physical modules, which can be located in one place or distributed across multiple network modules. Some or all modules can be selected according to actual needs to achieve the purpose of this embodiment. Those skilled in the art can understand and implement without creative labor.

An embodiment of the present disclosure also provides an electronic device (such as a blockchain network related device), including: a processor; a memory used to store processor executable instructions; wherein the processor is configured to implement a method suitable for a blockchain network as described in any of the above embodiments.

An embodiment of the present disclosure further provides a server, including: a processor; a memory used to store processor executable instructions; wherein the processor is configured to perform the method applicable to the server described in any of the above embodiments.

An embodiment of the present disclosure further provides a computer-readable storage medium on which a computer program is stored, and when the program is executed by a processor, the steps in the method applicable to a blockchain network described in any of the above embodiments are implemented.

An embodiment of the present disclosure further provides a computer-readable storage medium on which a computer program is stored, and when the program is executed by a processor, the steps in the method applicable to the server described in any of the above embodiments are implemented.

Figure 14:
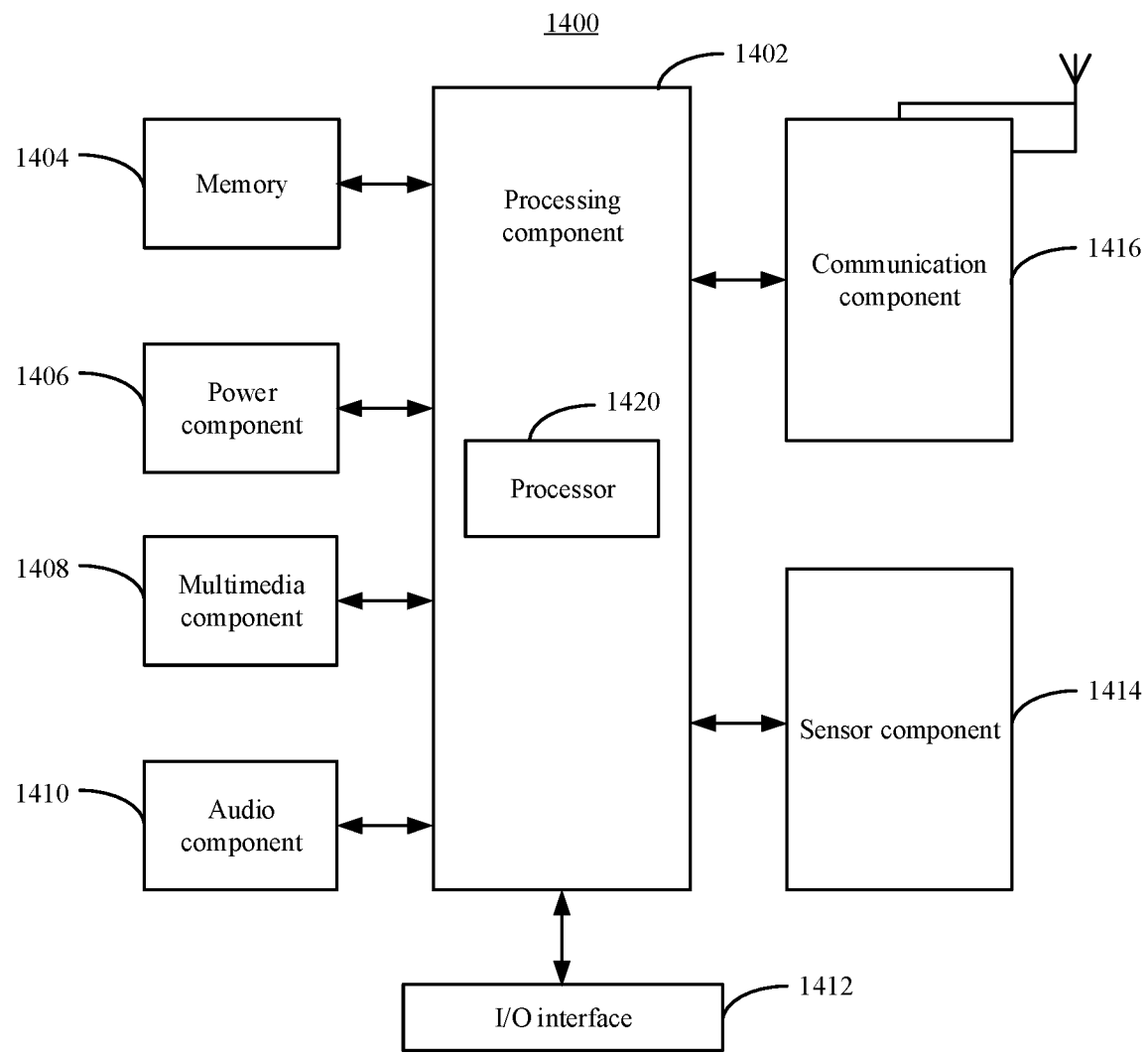
FIG. 14 is a schematic block diagram of an apparatus for traffic information processing according to an embodiment of the present disclosure.

FIG. 14 is a schematic block diagram of an apparatus 1400 for traffic information processing according to an embodiment of the present disclosure. For example, the apparatus 1400 may be a mobile phone, a computer, a digital broadcast terminal, a message transceiver device, a game console, a tablet device, a medical device, fitness equipment, a personal digital assistant or the like.

Referring to FIG. 14, the apparatus 1400 may comprise one or more of the following components: a processing component 1402, a memory 1404, a power component 1406, a multimedia component 1408, an audio component 1410, an input/output (I/O) interface 1412, a sensor component 1414 and a communication component 1416.

The processing component 1402 typically controls overall operations of the apparatus 1400, such as the operations associated with display, telephone calls, data communications, camera operations and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For example, the processing component 1402 may comprise a multimedia module to facilitate the interaction between the multimedia component 1408 and the processing component 1402.

The memory 1404 is configured to store various types of data to support the operation of the apparatus 1400. Examples of such data comprise instructions for any applications or methods operated on the apparatus 1400, contact data, phonebook data, messages, pictures, video, etc. The memory 1404 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the apparatus 1400. The power component 1406 may comprise a power management system, one or more power sources, and any other components associated with the generation, management, and distribution of power in the apparatus 1400.

The multimedia component 1408 comprises a screen providing an output interface between the apparatus 1400 and the user. In some embodiments, the screen may comprise a liquid crystal display (LCD) and a touch panel (TP). If the screen comprises the touch panel, the screen may be implemented as a touch screen to receive input signals from the user. The touch panel comprises one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 1408 includes a front camera and/or a rear camera. The front camera and the rear camera may receive an external multimedia datum while the apparatus 1400 is in an operation mode, such as a photographing mode or a video mode. Each of the front camera and the rear camera may be a fixed optical lens system or have focus and optical zoom capability.

The audio component 1410 is configured to output and/or input audio signals. For example, the audio component 1410 includes a microphone (MIC) configured to receive an external audio signal when the apparatus 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, and the like. The buttons may include, but are not limited to, a home button, a volume button, a starting button, and a locking button.

The sensor component 1414 comprises one or more sensors to provide status assessments of various aspects of the apparatus 1400. For instance, the sensor component 1414 may detect an open/closed status of the apparatus 1400, relative positioning of components, e.g., the display and the keypad, of the apparatus 1400, a change in position of the apparatus 1400 or a component of the apparatus 1400, presence or absence of user's contact with the apparatus 1400, an orientation or an acceleration/deceleration of the apparatus 1400, and a change in temperature of the apparatus 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor or a temperature sensor.

The communication component 1416 is configured to facilitate communication, wired or wirelessly, between the apparatus 1400 and other devices. The apparatus 1400 can access a wireless network based on a communication standard, such as WiFi, 2G or 3G, 4G LTE, 5G NR, or a combination thereof. In one exemplary embodiment, the communication component 1416 receives a broadcast signal or broadcast associated information from an external broadcast management system via a broadcast channel. In one exemplary embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an exemplary embodiment, there is also provided a non-transitory computer-readable storage medium comprising instructions, such as comprised in the memory 1404, executable by the processor 1420 in the apparatus 1400, for performing the above-described methods. For example, the non-transitory computer-readable storage medium may be a ROM, a RAM, a CD-ROM, a magnetic tape, a floppy disc, an optical data storage device or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

It should be noted that in this article, relational terms such as first and second are only used to distinguish one entity or operation from another entity or operation, and do not necessarily require or imply any actual relationship or order between these entities or operations. The terms "including", "comprising", or any other variation thereof are intended to encompass non-exclusive inclusion, such that a process, method, item, or device that includes a series of elements not only includes those elements, but also other elements that are not explicitly listed, or also include elements inherent in such a process, method, item, or device. Without further limitations, the elements limited by the statement "including one . . . " do not exclude the existence of other identical elements in the process, method, item, or equipment that includes the said elements.

The above provides a detailed introduction to the methods and apparatuses provided in the embodiments of the present disclosure. Specific examples are applied in this article to explain the principles and implementations of the present disclosure. The explanations of the above embodiments are only used to help understand the methods and core ideas of the present disclosure; Meanwhile, for ordinary skilled in the art, there may be changes in specific implementations and application scope based on the ideas of the present disclosure. Accordingly, the content of this specification should not be understood as a limitation of the present disclosure.

What is claimed is:

1. A traffic information processing method, applied to a blockchain network, and the method comprising:
   receiving transaction information sent by a first vehicle, the transaction information carrying violation information of a target vehicle detected by the first vehicle;
   triggering a smart contract based on the transaction information, the smart contract being used to determine second vehicles to verify the transaction information;
   sending the violation information to the second vehicles such that the second vehicles generate verification results based on the violation information;
   determining whether the target vehicle has violated traffic rules based on the verification results;
   if determining that the target vehicle has violated traffic rules, storing the violation information in the blockchain network; and
   sending the violation information to the target vehicle.

2. The traffic information processing method according to claim 1, wherein the transaction information further comprises a first location of the first vehicle, and the method further comprises:
   determining second locations of vehicles corresponding to further nodes other than a node corresponding to the first vehicle in the blockchain network; and
   wherein the smart contract is used to determine the second vehicles from the vehicles corresponding to the further nodes based on the first location and the second locations.

3. The traffic information processing method according to claim 2, wherein the transaction information also comprises a traveling direction of the first vehicle;
   wherein the smart contract is used to determine, from the vehicles corresponding to the further nodes, vehicles having a distance to the first location lower than a preset distance threshold and a traveling direction that meets a preset relationship with the traveling direction of the first vehicle, as the second vehicles.

4. The traffic information processing method according to claim 1, wherein the smart contract is used
   to determine, from the verification results, a first number of verification results which determine that the target vehicle has violated traffic rules, and
   to determine that the target vehicle has violated traffic rules when the first number is higher than a first number threshold.

5. The traffic information processing method according to claim 1, wherein the smart contract is used
   to determine, from the verification results, a second number of verification results which determine that a probability of the target vehicle violating traffic rules is higher than a probability threshold, and
   to determine that the target vehicle has violated traffic rules when the second number is higher than a second number threshold.

6. The traffic information processing method according to claim 1, wherein the smart contract is used
   to generate a sub contract and periodically trigger the sub contract; wherein the sub contract is used to determine third vehicles to reverify the transaction information at a triggering time of the sub contract; and
   to send the violation information to the third vehicles such that the third vehicles generate reverification results based on the violation information.

7. The traffic information processing method according to claim 6, wherein the smart contract is also used to determine a type of traffic rule violation behavior of the target vehicle based on the violation information; and
   wherein the smart contract generates the sub contract and periodically triggers the sub contract when determining that the type of behavior is a continuous behavior.

8. A traffic information processing method, applied to a server, and the method comprising:

receiving violation information of a target vehicle sent by a first vehicle when the first vehicle detects that the target vehicle violates traffic rules;

determining second vehicles to verify the violation information and sending the violation information to the second vehicles;

acquiring verification information obtained by the second vehicles based on the violation information, to determine whether the target vehicle has violated traffic rules based on the verification information, if determining that the target vehicle has violated traffic rules, storing the violation information; and sending the violation information to the target vehicle.

9. The traffic information processing method according to claim 8, further comprising:
determining a first location of the first vehicle;
determining further locations for further vehicles;
wherein determining second vehicles to verify the violation information comprises:
determining the second vehicles from the further vehicles based on the first location and the further locations.

10. The traffic information processing method according to claim 9, further comprising:
determining a traveling direction of the first vehicle;
wherein determining the second vehicles from the further vehicles based on the first location and the further locations comprises:
determining, from further locations, vehicles having a distance to the first location lower than a preset distance threshold and a traveling direction that meets a preset relationship with the traveling direction of the first vehicle, as the second vehicles.

11. The traffic information processing method according to claim 8, wherein the verification information comprises verification results of the second vehicles determining whether the target vehicle has violated traffic rules.

12. The traffic information processing method according to claim 11, wherein determining whether the target vehicle has violated traffic rules based on the verification information comprises:
determining, from the verification results, a first number of verification results which determine that the target vehicle has violated traffic rules, and
determining that the target vehicle violates traffic rules when the first number is higher than a first number threshold.

13. The traffic information processing method according to claim 11, wherein determining whether the target vehicle has violated traffic rules based on the verification information comprises:
determining, from the verification results, a second number of verification results which determine that a probability of the target vehicle violating traffic rules is higher than a probability threshold, and
determining that the target vehicle violating traffic rules when the second number is higher than a second number threshold.

14. The traffic information processing method according to claim 8, wherein the verification information comprises image information captured by the second vehicles which contains the target vehicle;
the method further comprises:
obtaining verification results as whether the target vehicle has violated traffic rules based on the image information.

15. The traffic information processing method according to claim 8, further comprising:
determining whether the violation information about the target vehicle has been received for a first time within a preset time range at a current time; and
if receiving violation information about the target vehicle for the first time, determining second vehicles to verify the violation information; otherwise, ignoring the violation information.

16. An electronic device comprising:
a processor;
a memory used to store processor executable instructions;
wherein the processor is configured to perform a traffic information processing method comprising:
receiving transaction information sent by a first vehicle, the transaction information carrying violation information of a target vehicle detected by the first vehicle;
triggering a smart contract based on the transaction information, the smart contract being used to determine second vehicles to verify the transaction information;
sending the violation information to the second vehicles such that the second vehicles generate verification results based on the violation information;
determining whether the target vehicle has violated traffic rules based on the verification results; and
if determining that the target vehicle has violated traffic rules, storing the violation information in the blockchain network; and
sending the violation information to the target vehicle.

* * * * *